(12) United States Patent
Gordon et al.

(10) Patent No.: US 7,288,126 B2
(45) Date of Patent: *Oct. 30, 2007

(54) BATTERY CELLS HAVING IMPROVED POWER CHARACTERISTICS AND METHODS OF MANUFACTURING SAME

(75) Inventors: John Gordon, College Station, TX (US); Brendan Coffey, Austin, TX (US); David Manko, Bryan, TX (US); Charles Edward Sesock, College Station, TX (US)

(73) Assignee: Rechargeable Battery Corporation, College Station, TX (US)

( * ) Notice: Subject to any disclaimer, the term of this patent is extended or adjusted under 35 U.S.C. 154(b) by 215 days.

This patent is subject to a terminal disclaimer.

(21) Appl. No.: 10/710,135

(22) Filed: Jun. 21, 2004

(65) Prior Publication Data

US 2005/0048363 A1    Mar. 3, 2005

Related U.S. Application Data

(63) Continuation-in-part of application No. 10/710,116, filed on Jun. 18, 2004, which is a continuation-in-part of application No. 10/846,020, filed on May 14, 2004.

(60) Provisional application No. 60/513,167, filed on Oct. 21, 2003, provisional application No. 60/503,298, filed on Sep. 16, 2003, provisional application No. 60/499,545, filed on Sep. 2, 2003.

(51) Int. Cl.
*H01M 2/02* (2006.01)
*H01M 2/18* (2006.01)
*H01M 4/04* (2006.01)
*H01M 4/42* (2006.01)

(52) U.S. Cl. .................... 29/623.1; 429/131; 429/164; 429/229

(58) Field of Classification Search ................... None
See application file for complete search history.

(56) References Cited

U.S. PATENT DOCUMENTS

| 4,011,103 A | 3/1977 | Kordesch |
| 4,029,855 A | 6/1977 | Dougherty et al. |
| 4,215,186 A | 7/1980 | Jaeger |

(Continued)

FOREIGN PATENT DOCUMENTS

WO    WO 01/48836 A2    7/2001

(Continued)

*Primary Examiner*—Jonathan Crepeau
(74) *Attorney, Agent, or Firm*—Factor & Lake, Ltd.

(57) ABSTRACT

A battery cell, and methods of manufacturing the same, having significantly improved capacity utilization at high discharge rates while maintaining much of the energy content and other feature advantages of typical cylindrical or prismatic alkaline cells, by implementing a novel cell construction that produces increased surface area between the anode and cathode. The cell comprises an inner electrode encapsulated by a separator and disposed within the interior space of the housing. The inner electrode comprises a substantially flat material in a folded configuration and formed such that an outer extent of the inner electrode is generally conforming to a contour defined by the interior surface of the cell housing. Two outer electrode portions are disposed within the interior space of the housing such that it is in ionic communication with the inner electrode and in electrical communication with the first terminal of the cell housing.

3 Claims, 22 Drawing Sheets

PLAN VIEW OF HRB FORMING OPERATION

I. PLANAR CATHODE / ANODE / CATHODE STACK PLACED IN DIE
II. FIRST FOLD
III. SECOND FOLD
IV. FORM IS COMPRESSED AND MOLDED INTO CYLINDER, PRIOR TO INSERTION INTO CAN

U.S. PATENT DOCUMENTS

| | | |
|---|---|---|
| 4,292,357 A | 9/1981 | Erisman et al. |
| 4,327,163 A | 4/1982 | Wheadon |
| 4,396,691 A | 8/1983 | Wheadon |
| 4,663,253 A | 5/1987 | Simonton et al. |
| 4,668,320 A | 5/1987 | Crabtree |
| 4,680,242 A | 7/1987 | Simonton et al. |
| 4,761,352 A | 8/1988 | Bakos et al. |
| 4,788,113 A | 11/1988 | Böhle et al. |
| 4,957,826 A | 9/1990 | Cheiky |
| 5,004,655 A | 4/1991 | Symanski |
| 5,075,183 A | 12/1991 | Yamaguchi et al. |
| 5,147,737 A | 9/1992 | Post et al. |
| 5,209,993 A | 5/1993 | Mix |
| 5,230,968 A | 7/1993 | Bones et al. |
| 5,384,211 A | 1/1995 | Choi et al. |
| 5,470,676 A | 11/1995 | Nakano |
| 5,523,183 A | 6/1996 | Koehler et al. |
| 5,558,952 A | 9/1996 | Knauer |
| 5,563,007 A | 10/1996 | Young et al. |
| 5,569,551 A | 10/1996 | Pedicini et al. |
| 5,580,676 A | 12/1996 | Honda et al. |
| 5,616,434 A | 4/1997 | Redden et al. |
| 5,626,989 A | 5/1997 | Doundoulakis |
| 5,635,312 A | 6/1997 | Yanagisawa et al. |
| 5,677,080 A | 10/1997 | Chen |
| 5,716,734 A | 2/1998 | Nakano |
| 5,935,724 A | 8/1999 | Spillman et al. |
| 5,948,561 A | 9/1999 | Urry |
| 5,958,088 A | 9/1999 | Vu et al. |
| 6,001,503 A | 12/1999 | Hercamp et al. |
| 6,037,077 A | 3/2000 | Nowaczyk |
| 6,074,781 A | 6/2000 | Jurca |
| 6,153,335 A | 11/2000 | Vutetakis et al. |
| 6,207,322 B1 | 3/2001 | Kelsey et al. |
| 6,258,473 B1 | 7/2001 | Spillman et al. |
| 6,261,717 B1 | 7/2001 | Luo et al. |
| 6,326,102 B1 | 12/2001 | Getz |
| 6,410,187 B1 | 6/2002 | Luo et al. |
| 6,451,486 B1 | 9/2002 | Davis et al. |
| 6,472,099 B1 | 10/2002 | Lee et al. |
| 6,482,543 B1 | 11/2002 | Shelekhin et al. |
| 6,492,059 B1 | 12/2002 | Hottori et al. |
| 6,514,637 B2 | 2/2003 | Treger et al. |
| 6,521,378 B2 | 2/2003 | Durkot et al. |
| 6,541,140 B1 | 4/2003 | Spillman et al. |
| 6,630,262 B2 | 10/2003 | Yang et al. |
| 2001/0038943 A1 | 11/2001 | Spillman et al. |
| 2001/0041276 A1 | 11/2001 | Yang et al. |
| 2002/0106557 A1 | 8/2002 | Fraser-Bell et al. |
| 2002/0132150 A1 | 9/2002 | Yang et al. |
| 2002/0160263 A1 | 10/2002 | Corrigan et al. |
| 2003/0162089 A1 | 8/2003 | Dreyer et al. |
| 2003/0186117 A1 | 10/2003 | Shokoohi et al. |
| 2004/0058234 A1 | 3/2004 | Slezak |
| 2005/0048362 A1* | 3/2005 | Coffey et al. ............... 429/161 |
| 2005/0048364 A1* | 3/2005 | Coffey et al. ............... 429/163 |

FOREIGN PATENT DOCUMENTS

| | | | |
|---|---|---|---|
| WO | WO 2005/022671 | * | 3/2005 |
| WO | WO 2005/022672 | * | 3/2005 |
| WO | WO 2005/022676 | * | 3/2005 |
| WO | WO 2005/117189 | * | 3/2005 |

* cited by examiner

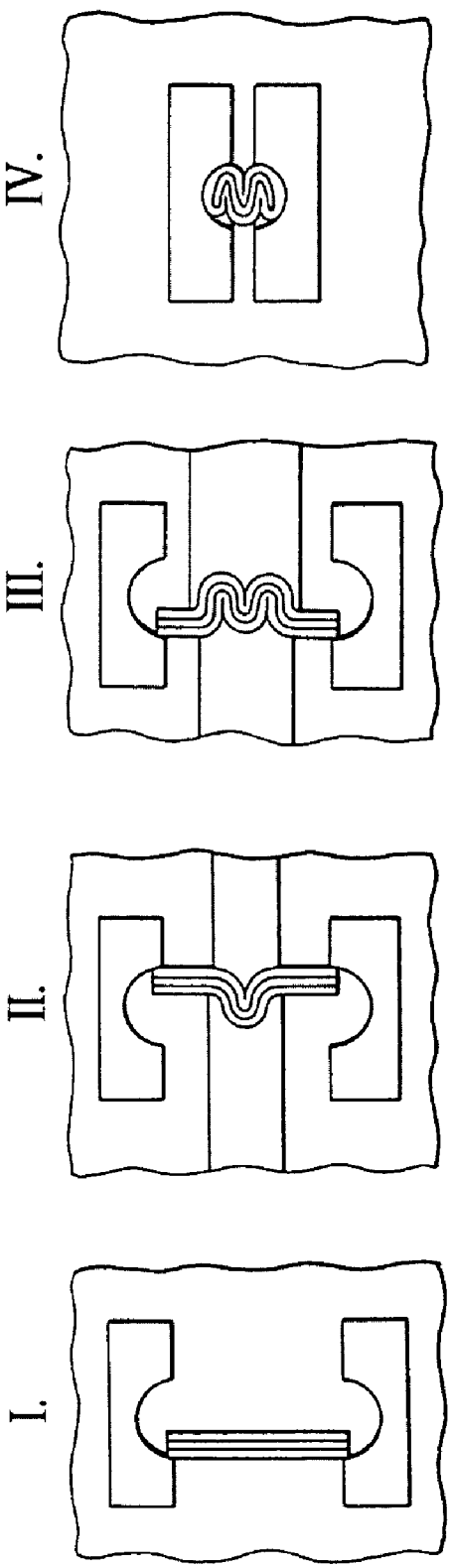

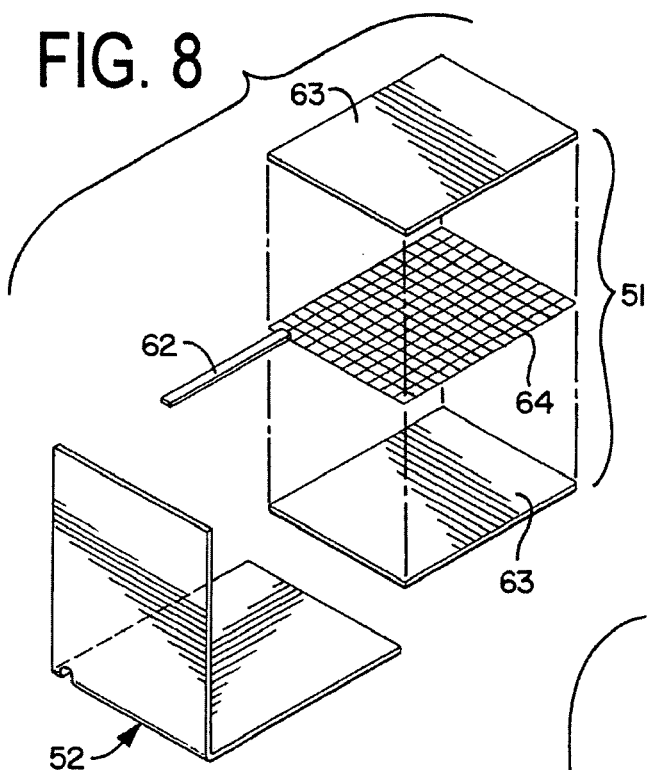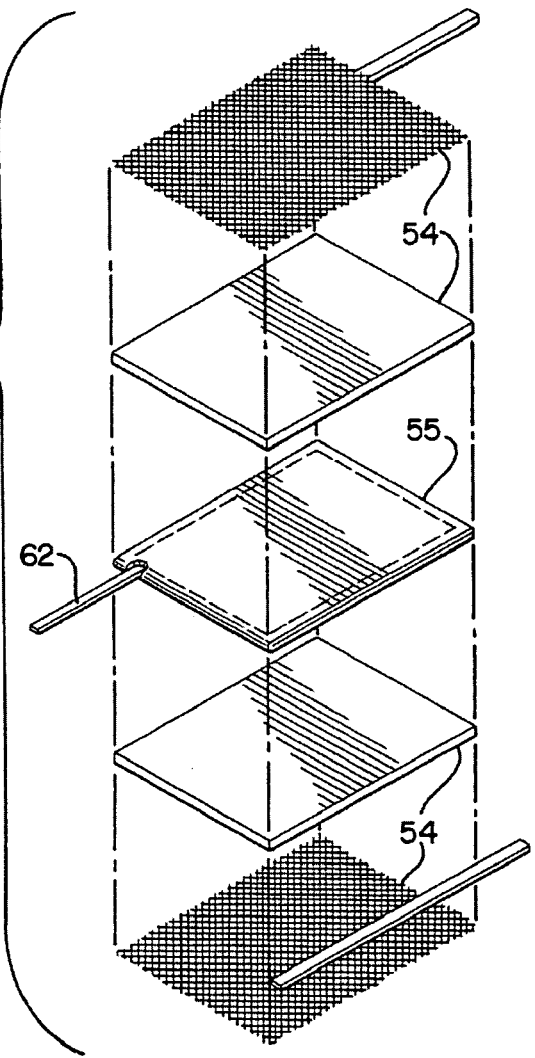

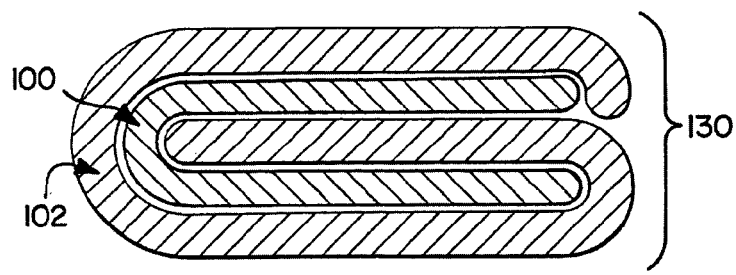
FIG. 14A
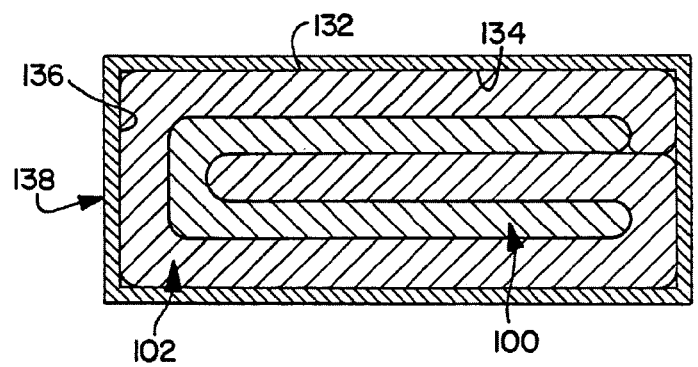
FIG. 14B
FIG. 15A
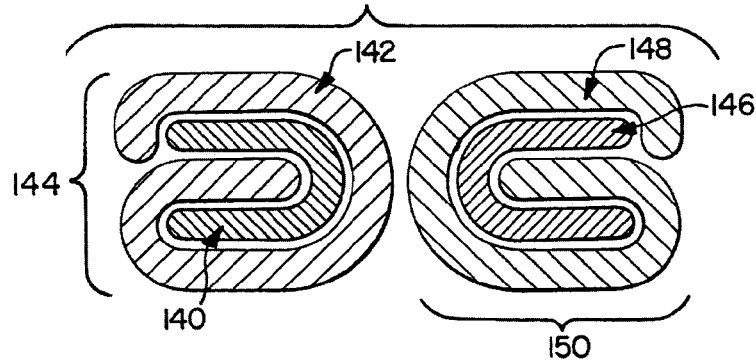
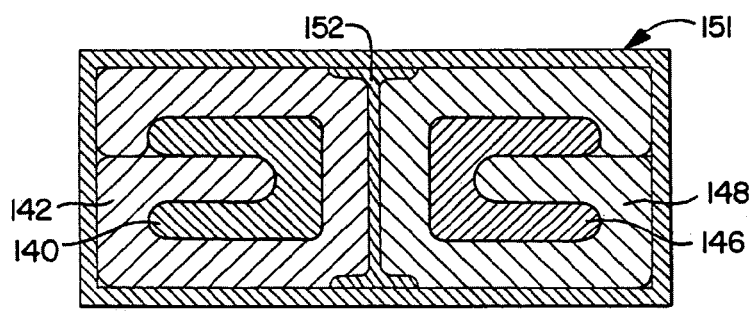
FIG. 15B

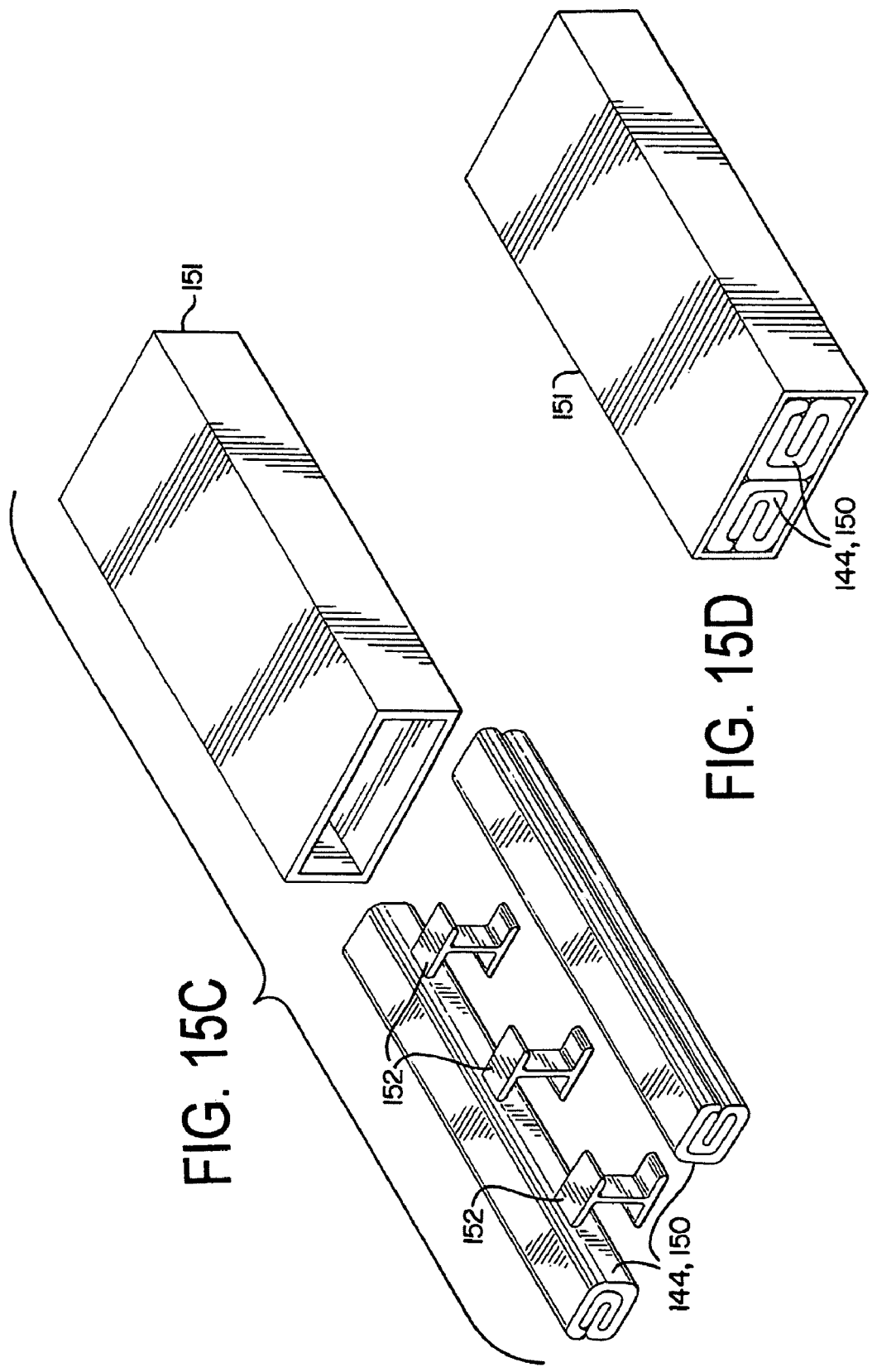

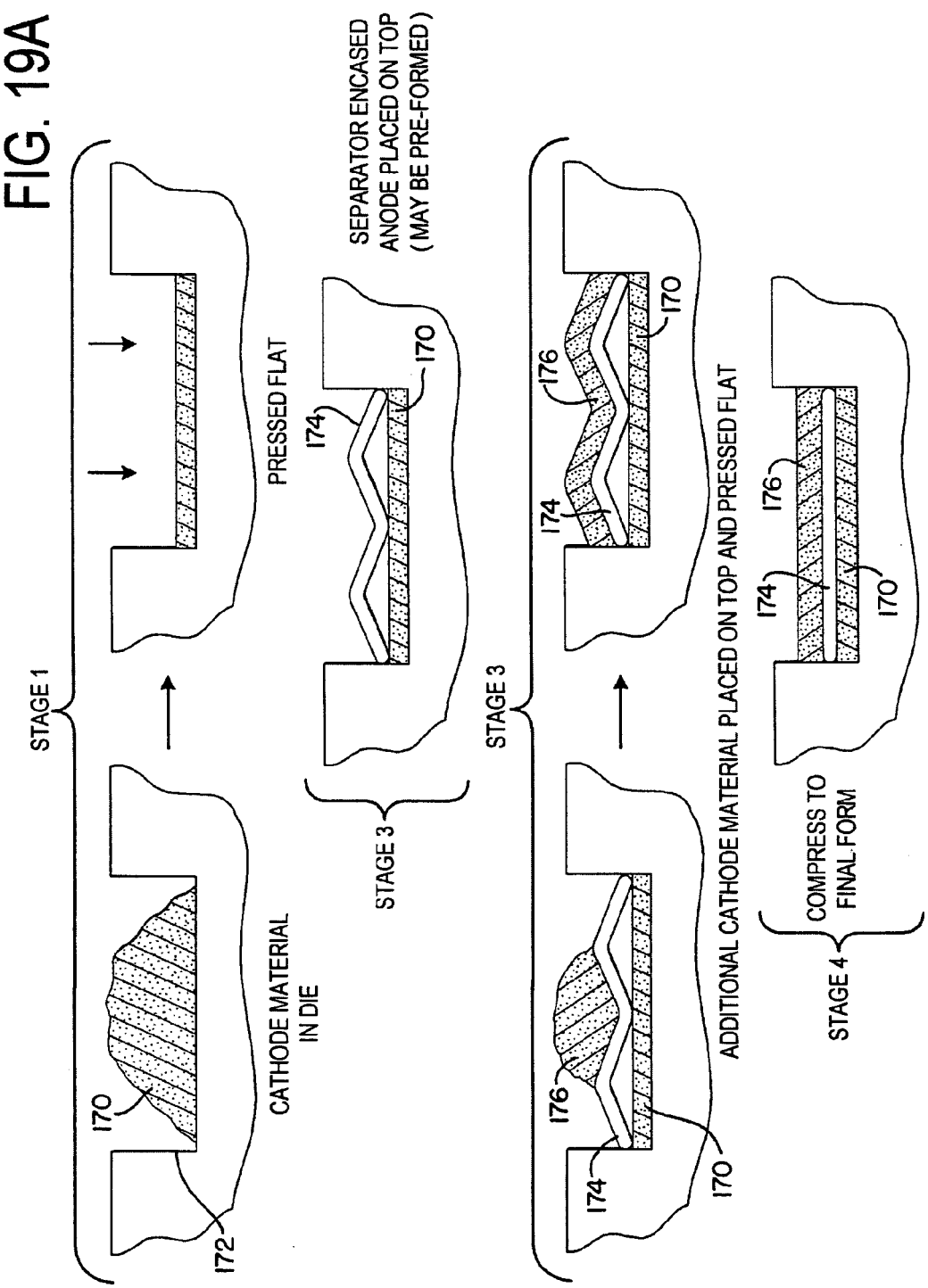

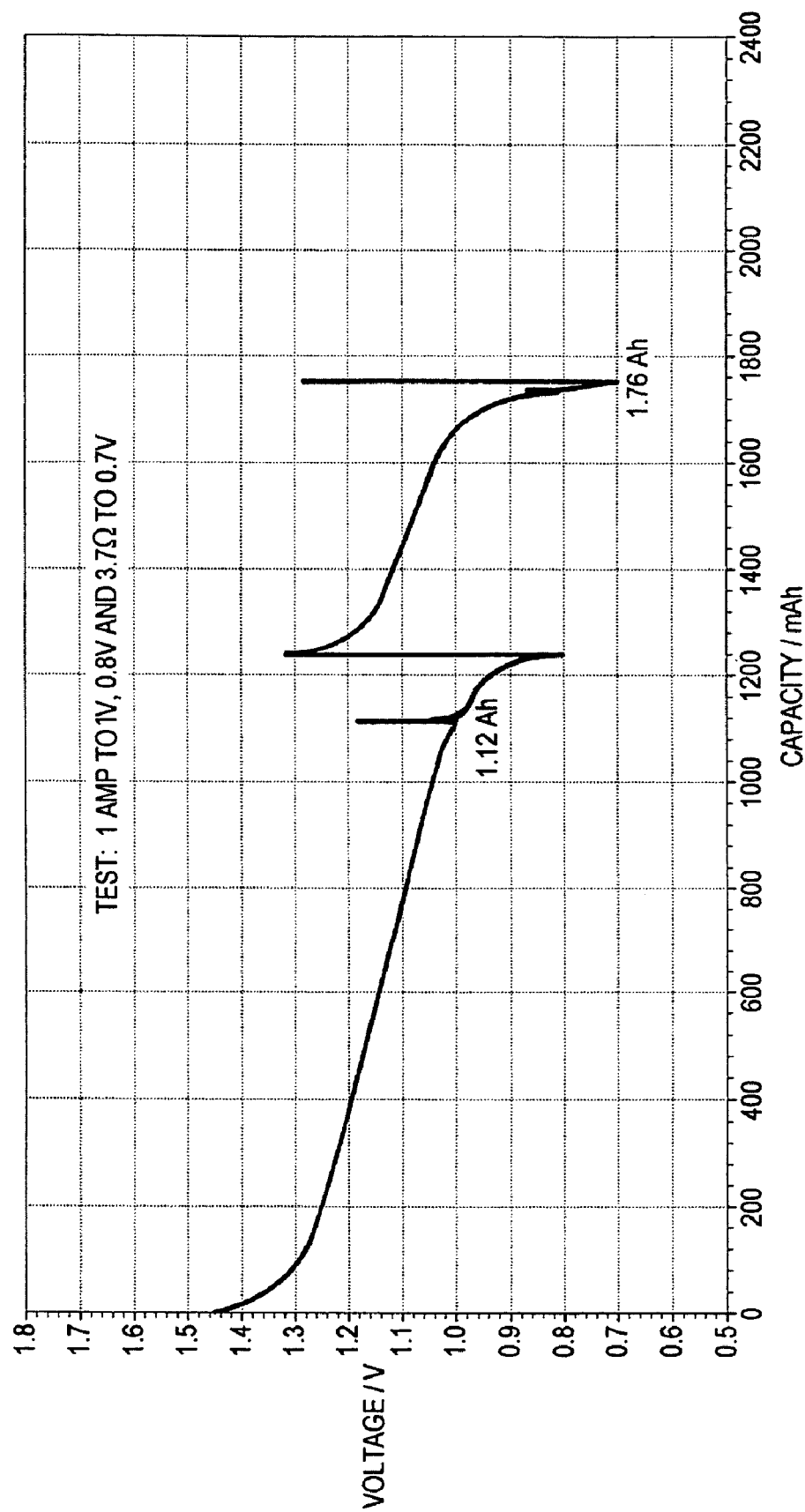

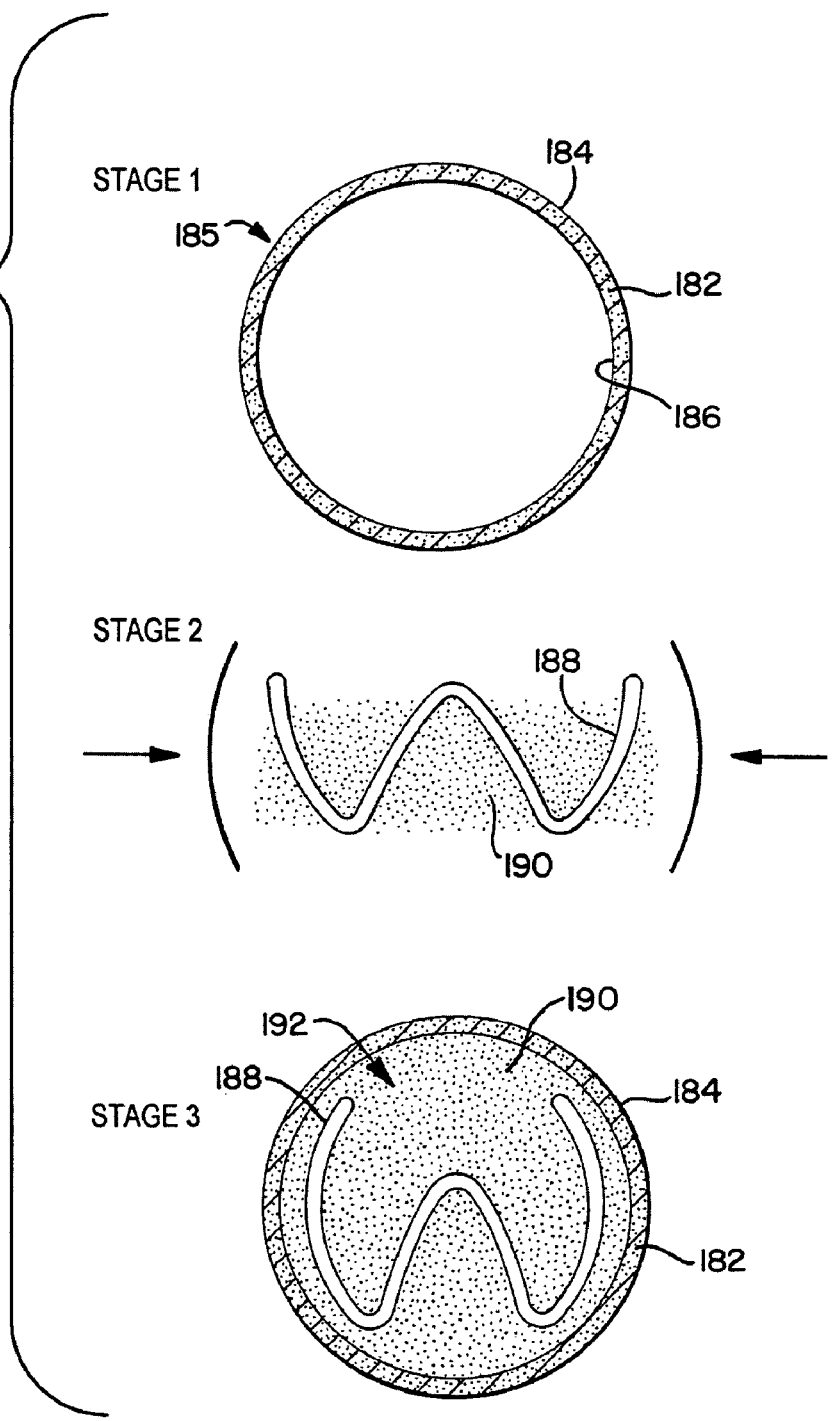

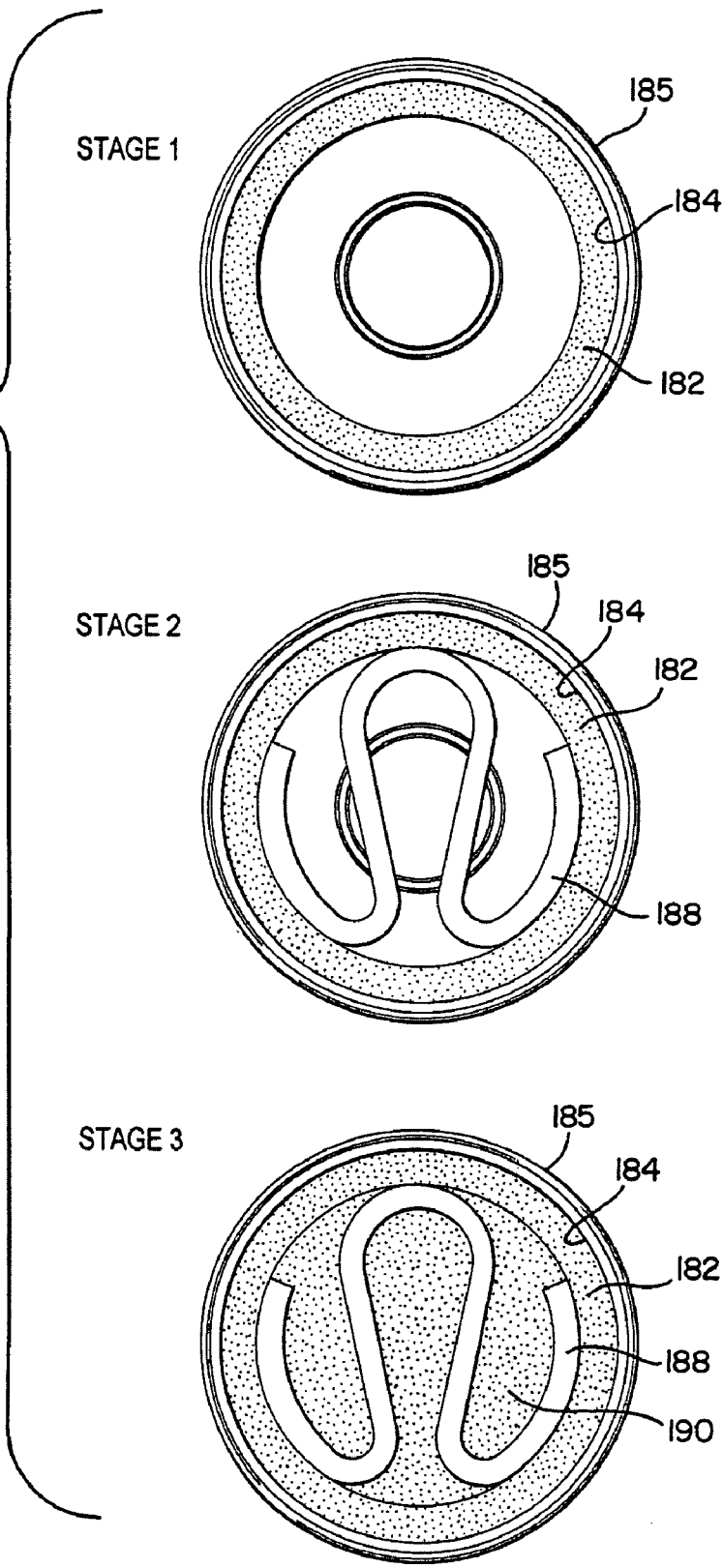

1. PRE-SHAPED SEPARATOR COVERED ANODE COMPRESSED AND INSERTED INSIDE RINGS
2. CATHODE MATERIAL INJECTORS INSERTED
3. CATHODE MATERIAL FILLED AS INJECTORS EXIT CAN

US 7,288,126 B2

BATTERY CELLS HAVING IMPROVED POWER CHARACTERISTICS AND METHODS OF MANUFACTURING SAME

CROSS REFERENCE TO RELATED APPLICATIONS

This application is a continuation-in-part of U.S. patent application Ser. No. 10/710,116, filed Jun. 18, 2004, which is a continuation-in-part of U.S. patent application Ser. No. 10/846,020, filed May 14, 2004, which claims priority to Provisional Application Ser. No. 60/499,545, filed on Sep. 2, 2003; Provisional Application Ser. No. 60/503,298, filed Sep. 16, 2003; and Provisional Application Ser. No. 60/513,167, filed Oct. 21, 2003, all of which are incorporated herein by reference.

BACKGROUND OF INVENTION

The present invention generally relates to electrochemical battery cells. More particularly, the invention relates to electrochemical battery cells, such as alkaline cells, having improved power and energy delivery capability through increased surface area interface between electrode components.

Alkaline batteries based on manganese dioxide cathodes and zinc anodes are widely used for consumer portable electronic applications. There is a large market for primary alkaline cells in standard cylindrical formats such as AAA, AA, C and D sizes. These products have numerous advantages. Zinc and manganese dioxide are inexpensive, safe and environmentally benign and the system provides good energy density. For the consumer, these standard alkaline products have long offered a simple and convenient universal solution for an array of electronic products.

There has been a proliferation in recent years, however, of new portable electronic devices including personal digital assistants, MP3 recorders and players, DVD players, digital cameras, or the like. There is also a trend toward smaller and lighter portable electronic devices that limit the onboard battery size. Compared to earlier devices, such as, for example, transistor radios, the power consumption for many of these new devices can require higher continuous or pulse currents. Conventional or even premium alkaline cell designs cannot efficiently deliver their stored energy at the higher drain rates.

FIG. 1 (section A) shows the capacity that can be delivered by a premium commercial alkaline AA cell under five discharge conditions intended to simulate various consumer electronics application loads (based on American National Standards Institute tests, Reference ANSI C18.1M, Part1-2001). At low drain rates (radio/43 ohm discharge) the alkaline AA "bobbin" cell delivers nearly all of its theoretical capacity (about 3 Ah); at intermediate loads (electronic game/250 mA discharge, motorized toy/3.9 ohm discharge) about two-thirds of theoretical; and at moderately high to high drain rates (photoflash/1 Amp pulse, digital camera/1 Amp continuous discharge), only ¼ to ½ of theoretical capacity can be accessed.

These inefficiencies under high rate discharge are related to internal resistance and electrochemical limitations of the conventional alkaline bobbin-cell construction. While much effort has gone into improving the energy content of the conventional alkaline bobbin cell by optimizing the internal packing and ionic conductivity of the electrodes, the fundamental design itself has changed little.

As shown in FIG. 2, a typical alkaline manganese dioxide-zinc bobbin cell 10 comprises the following main units: a steel can 12, optionally coated with a conductive coating on the inside of the can, defining a cylindrical inner space, a manganese dioxide cathode 14 formed by a plurality of hollow cylindrical pellets 16 pressed in the can, a zinc anode 18 made of an anode gel and arranged in the hollow interior of the cathode 14, and a cylindrical separator 20 separating the anode 18 from the cathode 14. The ionic conductivity between the anode and the cathode is provided by the presence of potassium hydroxide, KOH, electrolyte added into the cell in a predetermined quantity.

The can 12 is closed at the bottom, and it has a central circular pip 22 serving as the positive terminal. The upper end of the can 12 is hermetically sealed by a cell closure assembly which comprises a negative cap 24 formed by a thin metal sheet, a current collector nail 26 attached to the negative cap 24 and penetrating deeply into the anode gel to provide electrical contact with the anode, and a plastic top 28 electrically insulating the negative cap 24 from the can 12 and separating gas spaces formed beyond the cathode and anode structures, respectively. The material of separator 20 may consist of laminated or composite materials or combinations thereof. Typically separator materials comprise an absorbent fibrous sheet material wettable by the electrolyte, and an insulating material being impermeable to small particles but retaining ionic permeability.

While the bobbin cell construction is a simple design that allows for high-speed, low-cost manufacturing, the surface area between the anode and cathode in a conventional bobbin cell is limited to the geometrical surface area of the cylinder of separator between the anode and cathode. Thus, for a bobbin cell, the anode to cathode interfacial surface area ($S_i$) constituted by the interposed straight cylinder of separator is necessarily a fraction of the external surface area ($S_e$) formed by the cylindrical wall of the can $[(S_i)/(S_e)<1]$.

In the field of batteries, the surface area of and between the electrodes of an electrochemical cell is understood to be an important design element, since the mass transport flux of ions between anode and cathode (typically slower than electron transfer or chemical kinetics) can be a rate limiting or current limiting physical process. It is not only the ionic conductivity and surface area between the anode and cathode that is important but also the micro-porosity and surface area inside the electrodes.

It is possible to arrange for greater electrode and interfacial area within a cylindrical cell. The most widely used cylindrical cell design alternative to the bobbin cell is the spirally wound or jelly-roll construction which is well described in the Handbook of Batteries [$3^{rd}$ Edition, editors D. Linden and T. B. Reddy, Section 3.2.11, McGraw-Hill, 2002]. In this construction thin strips of anode and cathode with separator between them are tightly wound together. The electrodes can be as thin as a few tenths of a millimeter and for the spirally wound cylindrical cell the anode to cathode interfacial surface area can be several multiples of the external surface area formed by the cylindrical wall of the can $[(S_i)/(S_e)>>1]$. The greater interfacial area comes at the expense of additional complexity and cost to manufacture. Spiral winding requires precision alignment of anode, cathode, and separator, with lower production rates and higher capital equipment costs than "bobbin" construction cells. The spirally wound design is not typically applied to the alkaline $MnO_2$/Zn cell where it would defeat the economic advantage of the materials, but is applied to more premium electrochemical systems including rechargeable nickel cadmium (NiCd) and nickel metal hydride (NiMH) batteries, and non-rechargeable systems such as lithium iron disulfide (LiFeS$_2$) batteries.

Another trade-off of the spiral wound design is the higher amount of separator and current collector required, which take up volume that could otherwise be utilized for active material. Since a standard size cylindrical cell has a fixed volume, it is most efficiently built with maximum active material and electrolyte in order to maximize its energy content. In the bobbin cell, in addition to lower separator content and thick electrodes, the brass nail anode current collector and cathode current collection via contact with the cylindrical container wall do not significantly intrude on the interior space.

Thus, while converting from a bobbin design to spiral wound design increases the inter-electrode surface area and power capability, it also reduces the energy content of the cell. A spiral wound construction may deliver most of its energy efficiently for discharge rates on the order of 20 C (C refers to a current equivalent to the rated capacity of the cell in ampere-hours divided by 1 hour). Such high rate discharge capability may be essential for applications such as power tools, however is not typically needed for consumer electronics. Even devices such as digital cameras typically operate at more moderate discharge rates on the order of $\frac{1}{3}$ to 1 C rate.

More costly spirally wound batteries may be over designed for many portable applications. However, for alkaline manganese dioxide cells with a zinc anode and potassium hydroxide electrolyte to maintain their competitive advantage as a universal solution for a wide range of consumer applications, better run time at higher drain rates is needed. Much of the recent patent literature related to the alkaline cell is aimed at addressing this issue.

In addition to material and electrode formulation strategies to improve power capability, there have been a number of strategies to increase the interfacial surface area between the anode and cathode through modifications of the conventional bobbin cell. For example, Urry in U.S. Pat. No. 5,948,561 describes the use of a bisecting conductive plate coated with cathode active material to partition a V-folded tubular separator. Luo et al. in U.S. Pat. No. 6,261,717 and Treger et al. in U.S. Pat. No. 6,514,637 also describe the creation of multiple anode cavities that are in these cases molded into the cathode pellets. Getz in U.S. Pat. No. 6,326,102 describes a relatively more complex assembly with two separate zinc anode structures in contact with the inner and outer contours of separator encased cathode pellets. Jurca in U.S. Pat. No. 6,074,781 and Shelekhin et al. in U.S. Pat. No. 6,482,543 describe stepped interior or contoured interior surfaces of the cathode pellet. Shelekhin et al. in U.S. Pat. No. 6,482,543, Lee et al in U.S. Pat. No. 6,472,099 and Luo et al. in U.S. Pat. No. 6,410,187 describe branched or lobed interior electrode structures.

All of these design strategies have limitations in the effective increase in surface area that is possible and introduce additional complexities that detract from the utilitarian design of the conventional bobbin cell. Some may achieve greater surface area but at the sacrifice of a cell balance change that decreases the energy content. Multi-cavity or multiple electrode designs introduce the need for more complex current collection and end seals. The more complex geometries may introduce orientation requirements and the need for more complex tooling and machinery for assembly. Complex geometries can make it difficult to apply separator uniformly and consistently especially in high-speed production, and may necessitate unconventional approaches such as internally applied conformal coatings.

For example, branched or lobed designs have limited ability to increase surface area unless the lobes are made thinner which makes applying separator and filling uniformly with gelled anode more difficult. If the lobes or branches are not thinner and longer then not much increase in surface is provided and the cell balance may be changed to be less efficient due to changes in relative cross-sectional area of the anode and cathode structures. Alignment of cathode pellets and breakage of pellets in lobed designs could make manufacture difficult.

The foregoing problems associated with typical bobbin and spirally wound electrode configurations are not limited to cylindrical cell configurations. Thinner product profiles and more efficient use of battery compartment space are also driving a trend toward the use of thin prismatic (rectangular) cell formats and free-form cell formats. Analogs to the bobbin and spirally wound cell constructions also exist for prismatic cells, such as, for example, those shown in the Handbook of Batteries, [3$^{rd}$ Edition, editors D. Linden and T. B. Reddy, Section 3.2.11, McGraw-Hill, 2002]. In the simplest designs of prismatic cells, opposed unitary anode and cathode masses exchange ions across an interposed separator boundary. As an example, U.S. Patent Application Publication No. 2003/0157403 (Shelekin et al.) describes a thin prismatic IEC 7/5 F6 size alkaline cell with unitary opposed electrode masses in which the total interfacial area between the anode and cathode is less than the projected cross sectional area of the cell. Thus, such designs do not address the aforementioned power characteristic problems.

There are two design alternatives to increase power in a prismatic cell configuration. The wound cell construction can be adapted by winding the strips of electrodes on a flattened mandrel that may then be compressed before placing in the cell container. Alternatively, surface area within a prismatic cell can be increased by an assembly of alternating anode/cathode stacked electrode plates, with like electrodes connected in parallel within the cell. Both of these methods, however, are more complex and costly to produce than a simple bobbin cell.

In the case of prismatic cells, additional design considerations related to internal pressure arise. Alkaline cell products must remain within maximum allowable dimensions under all anticipated conditions of use and at all states of charge. These products do incorporate a safety vent but under a broad range of normal use conditions they are effectively sealed. Alkaline cell container walls must therefore be sufficiently constructed to contain any internal pressure caused by any gas generation or expansion associated with the cell's electrochemistry. Design accommodations can include low gassing zinc formulations and free internal volume for expansion, wherein the balance of the design relies on the mechanical strength of the container.

A cylindrical container is an effective pressure vessel with uniformly distributed hoop stresses acting to reduce radial strains and the wall thickness of cylindrical alkaline cells may be as little as 0.008". However, the prismatic form is not as effective at accommodating internal pressure and non-uniform bulging may occur with maximum deflections at the midpoint of the long wall spans. While increasing the wall thickness of the container can prevent bulging of the container, this also reduces the internal volume available for active electrode masses.

Having described many of the shortcomings of the prior art, the present invention is intended to, among other things, address these as well as other shortcomings in the prior art.

SUMMARY OF INVENTION

A battery cell, such as a cylindrical or prismatic alkaline cell, exhibiting significantly improved capacity utilization at high discharge rates while maintaining much of the energy content and other feature advantages of typical cylindrical or prismatic alkaline cells, by implementing a cell construction that produces increased surface area between the anode and cathode. In accordance with the principles of the present invention as embodied and described herein, one particular characterization of the present invention comprises an electrochemical battery cell comprising a cell housing defining an interior space having an interior surface, a first terminal and a second terminal. The cell further comprises an inner electrode encapsulated by a separator and disposed within the interior space of the housing. The inner electrode is in a folded configuration and is formed such that an outer extent of the inner electrode is generally conforming to a contour defined by the interior surface of the cell housing. The inner electrode is in electrical communication with the second terminal of the housing. An outer electrode is disposed within the interior space of the housing such that it is in ionic communication with the inner electrode and in electrical communication with the first terminal of the cell housing.

According to particular aspects of the present invention, the inner electrode is in an accordion-folded configuration or in a W-shaped configuration; the interior surface of the housing is in electrical communication with the first terminal and electrical communication between the outer electrode and the first terminal is established by contact between the outer electrode and the interior surface of the housing; and the inner electrode is an anode and the outer electrode is a cathode, wherein the first terminal has a positive polarity and the second terminal has a negative polarity.

According to another aspect, the inner and outer electrodes interface with each other to define an interelectrode surface area ($S_i$) and the cell housing further includes an exterior surface defining an exterior surface area ($S_e$). The ratio of the inter-electrode surface area to the external surface area of the housing of the battery cell ($S_i/S_e$) is in the range of about 2 to about 8.

According to another aspect, an electrochemical battery cell comprises a cell housing defining an interior space, a first terminal and a second terminal; and an electrode assembly disposed within the interior space of the housing. The electrode assembly comprises an inner electrode encapsulated by a separator and having a folded configuration, and an outer electrode having a folded configuration intermeshing with the folded configuration of the inner electrode. The electrode assembly is formed such that an outer extent of the electrode assembly is generally conforming to a contour defined by the interior surface of the cell housing. The inner electrode is in electrical communication with the second terminal of the housing and the outer electrode is in electrical communication with the first terminal of the housing.

According to yet another aspect, an electrochemical battery cell comprises a cylindrically-shaped cell housing defining an interior space, a first terminal and a second terminal. The cell further comprises an electrode assembly disposed within the interior space of the housing. The electrode assembly comprises a pair of outer electrodes and an inner electrode encapsulated by a separator and disposed between the outer electrodes. The electrode assembly has a folded configuration such that each of the electrodes intermeshingly engages the other. The electrode assembly is formed such that an outer extent of the electrode assembly is generally conforming to the cylindrically-shaped cell housing. The inner electrode is in electrical communication with the second terminal of the housing and the outer electrode is in electrical communication with the first terminal of the housing.

According to yet another aspect, an electrochemical battery cell comprises a cell housing defining an interior space, a first terminal and a second terminal. The cell further comprises an inner electrode having a linearly geometric configuration having a cross-sectional area substantially less than an exterior surface area of the inner electrode and disposed within the interior space of the housing. The inner electrode is encapsulated by a separator and in electrical communication with the second terminal of the housing. The cell further comprises an outer electrode material disposed and formed within the interior space of the housing such that the inner electrode is embedded therein. The outer electrode is in ionic communication with the inner electrode and electrical communication with the first terminal of the cell housing.

According to yet another aspect, an electrochemical battery cell comprises a cell housing defining an interior space, a first terminal and a second terminal. The cell further comprises an electrode assembly disposed within the interior space of the housing. The electrode assembly comprises an inner electrode encapsulated by a separator and an outer electrode. The electrodes are intermeshed together to from an interface and compressed such that an outer extent of the electrode assembly is generally conforming to a contour defined by the interior surface of the cell housing. The inner electrode is in electrical communication with the second terminal of the housing and the outer electrode is in electrical communication with the first terminal of the housing.

Methods of manufacturing an electrochemical battery cell in accordance with the principles of the present invention are also contemplated. According to a particular aspect of the present invention, a method of manufacturing an electrochemical battery cell is provided comprising the steps of: providing a battery cell housing including an interior space, a first terminal and a second terminal; providing an inner electrode having a substantially flat configuration and encapsulated by a separator; providing an outer electrode having a substantially flat configuration; disposing the outer electrode adjacent the inner electrode; folding the inner and outer electrodes together into a folded configuration; forming the inner electrode such that an outer extent of the electrodes is generally conforming to a contour defined by the interior space of the cell housing; and disposing the electrodes within the interior space of the housing such that the outer electrode is in electrical communication with the first terminal of the cell housing and the inner electrode is in electrical communication with the second terminal of the cell housing.

Other methods in accordance with the principles of the present invention are contemplated as well.

The methods of manufacturing an electrochemical battery cell in accordance with the principles of the present invention can be readily translated to automated high-speed production. One or more steps of these methods can be envisioned as replacing certain unit operations in a conventional bobbin cell manufacturing plant, with others being similar to those for conventional bobbin manufacturing, while maintaining equivalent throughput rates.

These and other aspects of the present invention will be apparent after consideration of the written description, drawings and claims herein.

BRIEF DESCRIPTION OF DRAWINGS

FIGS. 4A and 4B are cross-sectional elevational and plan views, respectively, of an embodiment of the present invention incorporating a linearly geometric inner electrode.

FIG. 7 is a schematic diagram depicting various stages in an assembly sequence in accordance with the principles of the present invention.

FIG. 8 is a schematic diagram depicting an assembly in accordance with the principles of the present invention.

FIG. 9 is a schematic diagram depicting an assembly in accordance with the principles of the present invention.

FIG. 14A is a cross-sectional plan view of an additional embodiment of a folded electrode assembly in accordance with the principles of the present invention.

FIG. 14B is a cross-sectional plan view of the folded and formed electrode assembly of FIG. 14A disposed within a prismatic cell housing in accordance with the principles of the present invention.

FIG. 15A is a cross-sectional plan view of a pair of folded electrode assemblies in accordance with the principles of the present invention.

FIG. 15B is a cross-sectional plan view of the folded and formed electrode assemblies of FIG. 15A disposed within a prismatic cell housing in accordance with the principles of the present invention.

FIG. 15C is an assembly view of the prismatic cell of FIG. 15B in accordance with the principles of the present invention.

FIG. 15D is a perspective view of the assembled prismatic cell of FIG. 15C.

FIG. 19A is a schematic diagram depicting aspects of a method of manufacturing in accordance with the principles of the present invention.

FIG. 19C is a graph depicting performance characteristics of a cell manufactured similarly to the method of FIG. 19A.

FIG. 20A is a schematic diagram depicting aspects of a method of manufacturing and a related embodiment in accordance with the principles of the present invention.

FIG. 20B is a schematic diagram depicting various stages of a battery cell manufactured in accordance with a method of manufacturing in accordance with the principles of the present invention.

DETAILED DESCRIPTION

Figure 1:
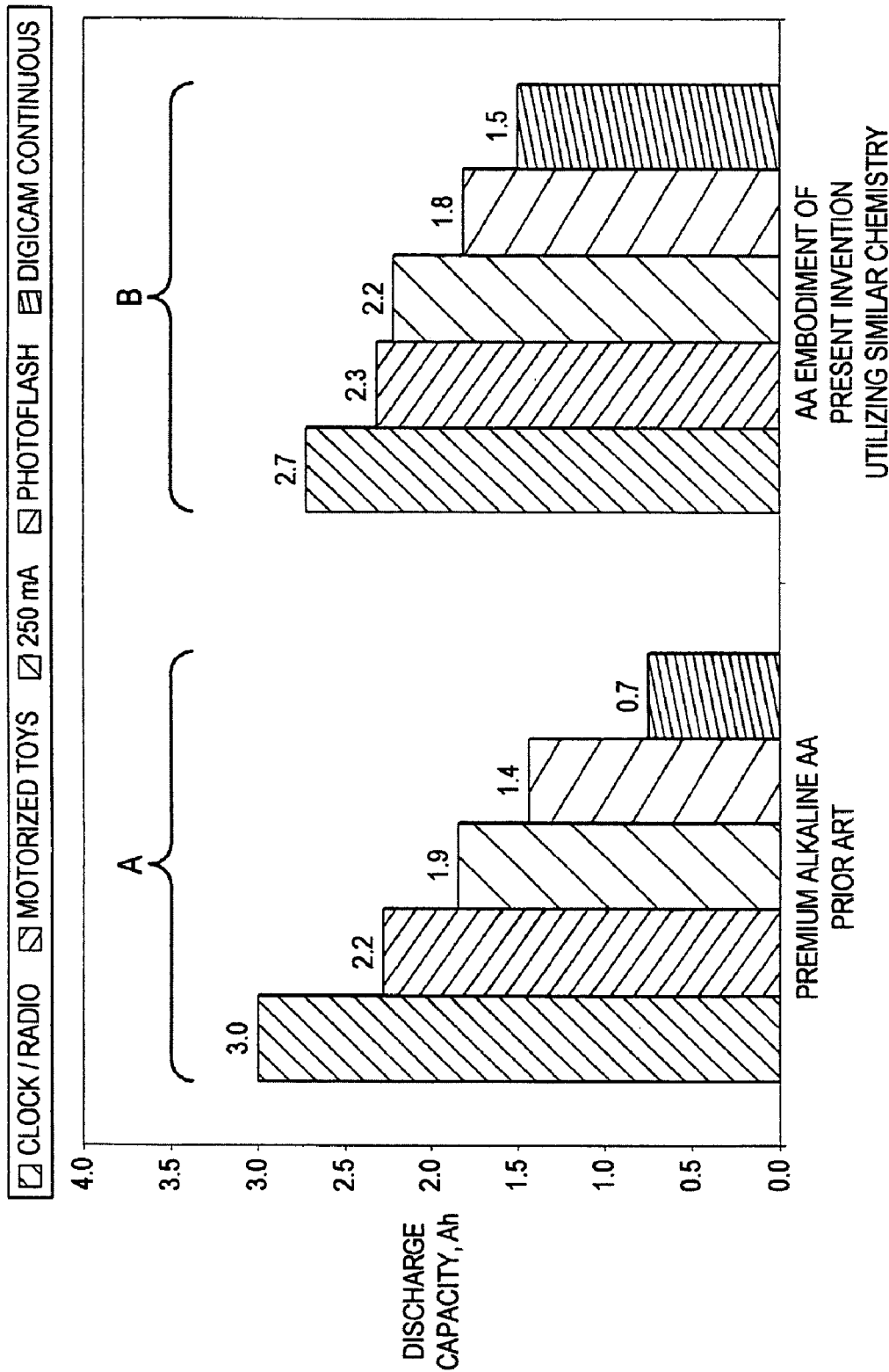
FIG. 1 is a graph depicting the approximate discharge capacity in Ah for various ANSI type tests for a current commercial premium AA cell (prior art) and a AA cell embodiment in accordance with the present invention.
Figure 2:
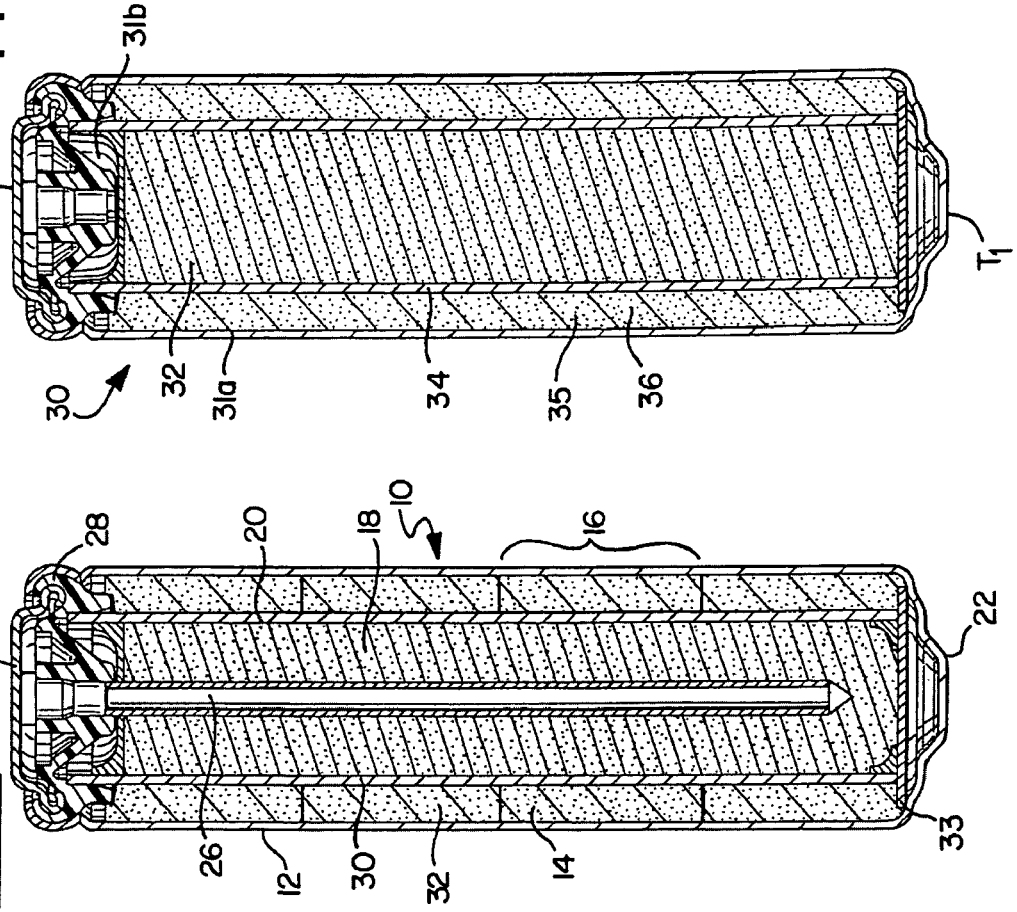
FIG. 2 is a cross-sectional elevational view of a typical cylindrical cell having a bobbin-type construction.

While the present invention is capable of embodiment in many different forms, there is shown in the drawings, and will herein be described in detail, one or more specific embodiments with the understanding that the present disclosure is to be considered an exemplification of the principles of the invention and is not intended to limit the invention to these specific embodiments.

The present invention provides a simple and effective design of a battery cell, such as a cylindrical cell, with balanced energy and power characteristics intermediate between the bobbin and spiral wound designs and which retains the advantages of both designs, i.e., low cost, simple manufacturing with higher power, and high internal volume utilization for energy efficiency. In an embodiment, this is achieved by providing a significant but balanced increase of anode to cathode interfacial surface area in conjunction with thinner, high ionic conductivity, electrode structures. The present invention also provides a better balanced alkaline "modified" bobbin design which can be applied to various cell sizes including AAA, AA, C, D and others, so that higher capacity is available at higher drain rates while the favorable energy storage characteristics are retained.

An exemplification of this higher capacity benefit of the present invention is shown in FIG. 1, which demonstrates that the present invention provides a more balanced utilization profile of a AA size cylindrical cell through increased capacity available at higher drain rates, when compared to a commercial high rate alkaline bobbin cell. In the example of FIG. 1, 1.5 Ah or approximately 50% of the theoretical capacity is delivered on the ANSI digital camera test (versus 25% for a typical conventional bobbin cell, as shown in FIG. 1 section A), while still achieving at least equivalent discharge capacities on moderate rate tests such as that for motorized toys (3.9 ohm). Only at the very lowest discharge rates is there any discernable loss of apparent discharge capacity which is nevertheless still at least 70-80% of the theoretical or typical low drain rate capacity of a conventional alkaline bobbin cell. Thus, approximately 50% or more of the theoretical capacity can be obtained at a C/2 C/3 discharge rate while greater than 70% of the theoretical capacity can be achieved at a C/10 discharge rate.

Figure 3:
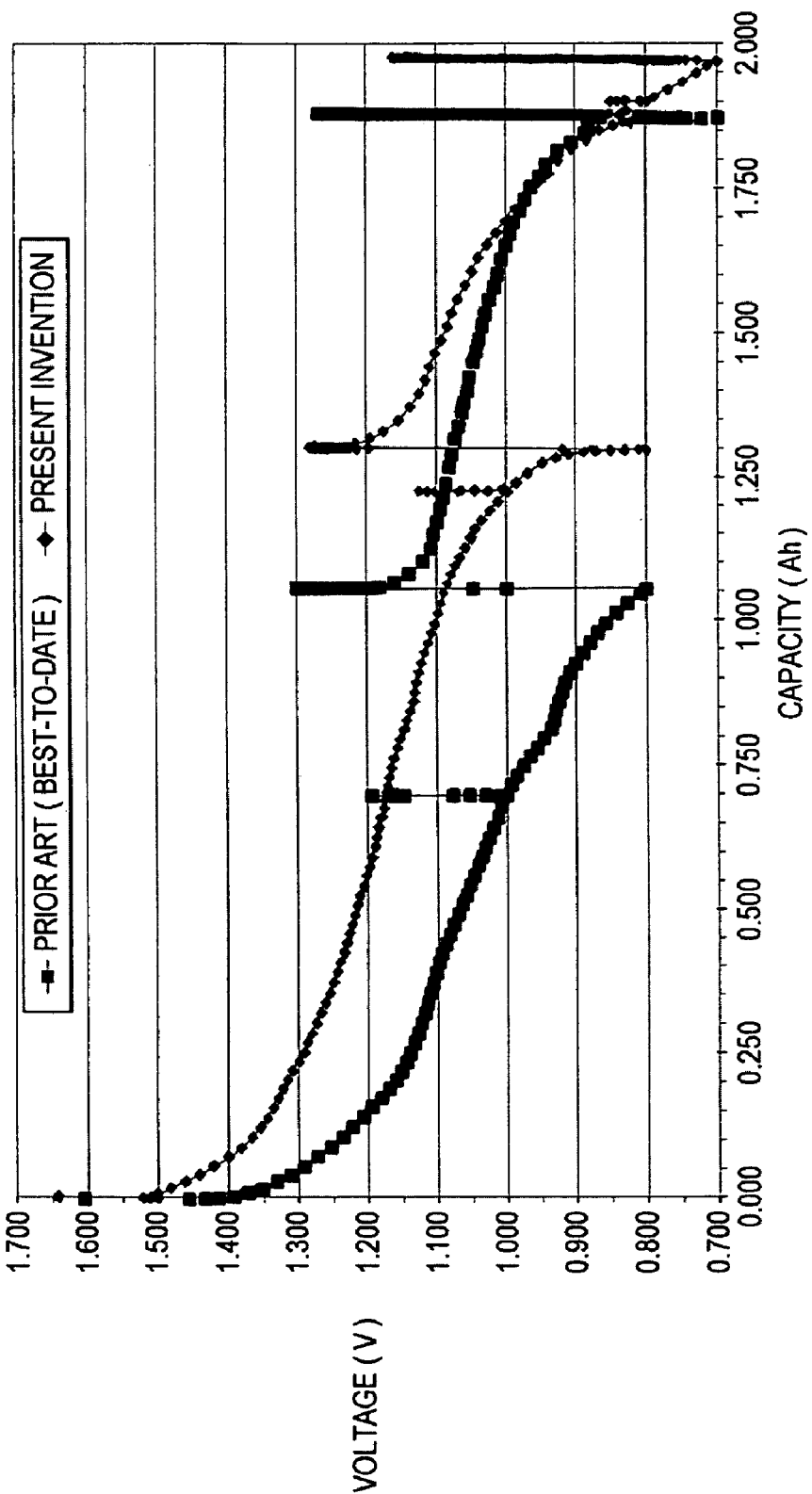
FIG. 3 is a graph depicting cell potential versus discharge capacity for 1 Amp discharge of an embodiment in accordance with the present invention compared to a commercial cell of the prior art.

FIG. 3 shows a comparison of the voltage curves for a conventional alkaline cell compared to the voltage curve under the same discharge conditions for a cell in accordance with the principles of the present invention. As can be seen from FIG. 3, a cell in accordance with the principles of the present invention delivers approximately twice the capacity as the conventional alkaline cell on a 1 ampere discharge to a 1.0 volt cutoff, with approximately equivalent cumulative capacity out as discharge is continued over a 3.9 ohm resistor.

An effective way to characterize the ability of the invention to provide a well-balanced ratio of power to energy is to perform certain tests on assembled cells. The particular test utilized consists of a series of discharge steps to evaluate performance at a high rate discharge followed by a lower rate discharge to evaluate total capacity delivery capability. The specifics of the test for a AA size cell are: (1) a continuous discharge at 1.0 A to a voltage cutoff of 1.0 V; (2) a 30 second open circuit test; (3) a continuous discharge at 1.0 A to a 0.8 V cutoff; (4) a 30 minute open circuit test; (5) a 3.9 Ohm discharge to 0.7 V cutoff. This test is identified by the assignee of the present invention as a DCC4STP2 test. Other size cells may be tested similarly, but with increased or reduced current levels to reflect the capability of the cell size.

By performing tests of this type on cells utilizing the current invention and on conventional bobbin-type alkaline cells, a clear distinction in performance can be established A capacity delivery ratio ($C_R$) can be calculated by dividing the capacity delivered to 1.0 V at 1.0 A ($C_{1V}$) to the total capacity delivered ($C_T$) in the test. Because the present invention utilizes an effective linearly geometric and thin inner electrode (thin meaning having a cross-sectional area substantially less than an exterior surface area of the inner electrode), the capacity ratio ($C_R$) will be significantly higher than that achieved in conventional bobbin-type alkaline cells.

Having demonstrated some of the performance benefits over conventional cells, the apparatus of battery cells in accordance with the principles of the present invention will now be described. Referring now to the drawings, in which like numerals refer to the like parts throughout the several figures, FIGS. 4A and 4B show an embedded inner electrode design, which is one possible implementation of the current invention.

Referring to FIGS. 4A and 4B, a battery cell 30 includes a cell housing 31a defining an interior space 31b of the battery cell 30. The cell housing 31a includes a first terminal T1 and a second terminal T2 for facilitating electrical connection of the cell 30 and electrical communication with other elements of the cell 30. The cell 30 further includes an inner electrode 32, such as an anode, having a thin cross section 32A in a linearly geometric configuration in the form of an asterisk-like shape, which utilizes a plurality of linear elements 32B. Other linearly geometric configurations can be implemented as well, such as a cross-like shape or any other geometry comprising linear elements or similar elements having relatively thin cross sections, i.e., thickness dimensions of its linear elements, compared to the cross section of the cell housing in a similar plane. In a preferred embodiment, the inner electrode has a thickness dimension substantially less than a dimension extending across a maximum span of a cross section of the cell housing taken in parallel to the thickness dimension. In a preferred embodiment, the inner electrode 32 comprises a porous solid extruded composite, which is made of active materials, conductive material and additives. An internally formed current collector 33 may also be included. The inner electrode 32 is disposed within the interior space 31b of the housing 30. The inner electrode 32 is encapsulated by a separator 34 and in electrical communication with the second terminal T2 of the housing 30. An outer electrode material 35, such as a cathode material, is disposed and formed within the interior space 31b of the housing such that the inner electrode 32 is embedded therein and forming an outer electrode 36. The outer electrode 36 is in ionic communication with the inner electrode 32 and electrical communication with the first terminal T1 of the cell housing 30. By embedding the inner electrode in the outer electrode, an electrode interface is defined, which can be further defined by an inter-electrode surface area. As shown in FIGS. 4A and 4B, a significant and balanced increase of anode to cathode interfacial surface area is achieved by virtue of the electrode geometry. Further, thinner, high ionic conductivity, electrode structures are achieved by virtue of the thin cross sections of the inner electrode. Performance characteristics of the cell can be changed by changing the electrode geometry, which affects the interfacial surface area between the electrodes.

Since the inner electrode 32 is a porous solid structure, the elements 32B can be thinner and longer than lobes or branches of prior art designs. For example, in a AA cell, the inner electrode 32 may be extruded into a shape that has thin elements 32B only 0.040 0.080 inches thick, whereas the equivalent anode diameter in a conventional AA alkaline cell would be about 0.30 inches. In this case, the inner electrode 32 can be accessed from each side of the element 32B with the maximum effective diffusion thickness equal to one half the through thickness. By using a solid inner electrode, not only can thinner geometric elements be achieved by virtue of not needing to fill a narrow void with gel as with prior designs but the conformal coated separator 34 can be applied to an external surface 37 of the inner electrode 32 by dipping or spraying rather than attempting to apply a separator to the inner surface of a complex geometry outer electrode as with prior designs. The outer electrode 36 can then be applied around the separator encased inner electrode 32, either external to the cell housing 31 or after the inner electrode is disposed within the cell housing 31. In an embodiment wherein the outer electrode is applied within the housing 30, the inner electrode 32, in the form of an anode and having a linearly geometric configuration, can be inserted into the housing 31 which can then filled with a cathode powder and pressed to form an embedded inner electrode 32.

Figure 5A:
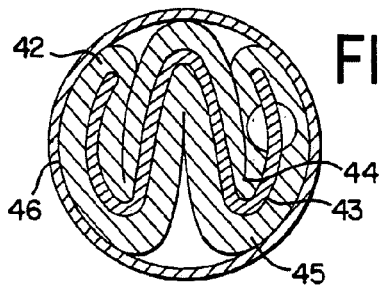
FIG. 5A is a cross-sectional plan view of a preferred embodiment incorporating a corrugated fold electrode assembly in accordance with the present invention.
Figure 5B:
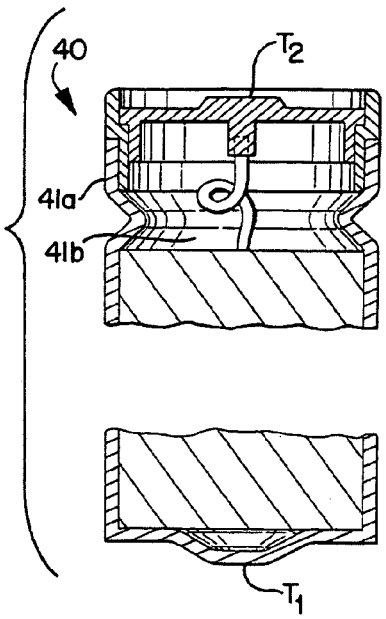
FIG. 5B is a partial cross-sectional elevational view of the embodiment of FIG. 5A.
Figure 5C:
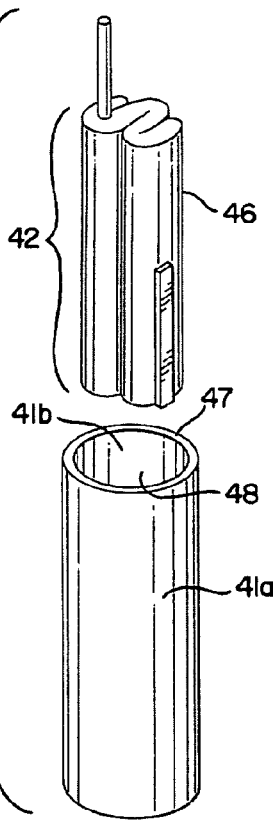
FIG. 5C is an assembly view of the embodiment of FIG. 5A.
Figure 5D:
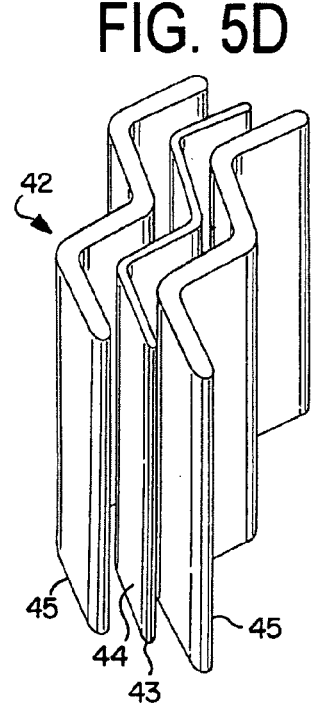
FIG. 5D is a perspective view of an electrode assembly prior to formation to fit within a housing, in accordance with the principles of the present invention.

Another way of achieving the embedding of the inner and outer electrodes in the cell housing would be to bend or fold the electrodes together externally to the housing to form an electrode geometry, mold the electrodes into a shape or contour conforming to the housing, and then inserting them together into the housing. Referring now to FIGS. 5A 5D, a preferred implementation of the present invention can be achieved by starting with a simple inner electrode geometry, covering it with a separator and surrounding it with an outer electrode material and then forming the geometry needed to fit the cell container. As shown in FIGS. 5A 5C, an electrochemical battery cell 40 includes a cell housing 41a defining an interior space 41b. The cell housing 41a includes a first terminal T1 and a second terminal T2 for facilitating electrical connection of the cell 40 and electrical communication with other elements of the cell 40. Referring to FIG. 5A, the cell further includes an electrode assembly 42 disposed within the interior space 41b of the housing 41a. The electrode assembly 42 comprises an inner electrode 43 encapsulated by a separator 44 and an outer electrode 45. The inner electrode and the outer electrode have a thin cross section and are in a folded configuration, such as a "W" folded configuration as shown in FIG. 5D, or other folded configuration such as an accordion fold, such that each of the intermesh with each other. Referring to FIG. 5C, the electrode assembly 42 is formed such that an outer extent 46 of the electrode assembly 42 is generally conforming to a contour 47 defined by an interior surface 48 of the cell housing 40. The inner electrode 43 is in electrical communication with the second terminal T2 of the housing 41a and the outer electrode 45 is in electrical communication with the first terminal T1 of the housing 41a. The interior surface 48 is preferably in electrical communication with the first terminal T1, such that electrical communication between the outer electrode 45 and the first terminal T1 can be established by contact between the outer electrode 45 and the interior surface 48 of the housing 41a.

As shown in FIG. 5D, the inner electrode 43 can be wrapped or conformal coated with the separator 44 and then sandwiched or intermingled with an outer electrode 45 to form the electrode assembly 42. The resulting electrode assembly can then be shaped into various geometries to fit into the housing 41a, as shown in FIG. 5C. The interface between the inner and the outer electrodes is thus not a uniform cylinder, as with prior designs, but may be of complex shape such that the separator covered surface of the encapsulated inner electrode will have an external surface area that is greater than the surface area of a conventional bobbin cell, but less than the surface area of a conventional spirally wound cell. The encapsulated inner electrode is thinner than in a conventional bobbin cell but not as thin as in spiral wound cell. The design achieves a better balance of surface area so that less separator and current collector is used for the encapsulated electrode cell than for a conventional spiral wind design thereby increasing the volume available for active material and thus the energy content.

Figure 6:
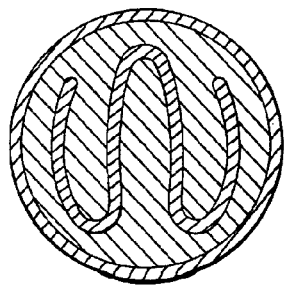
FIG. 6 is a cross-sectional plan view of an embodiment in accordance with the principles of the present invention having a corrugated fold anode embedded in a cathode material.
Figure 10:
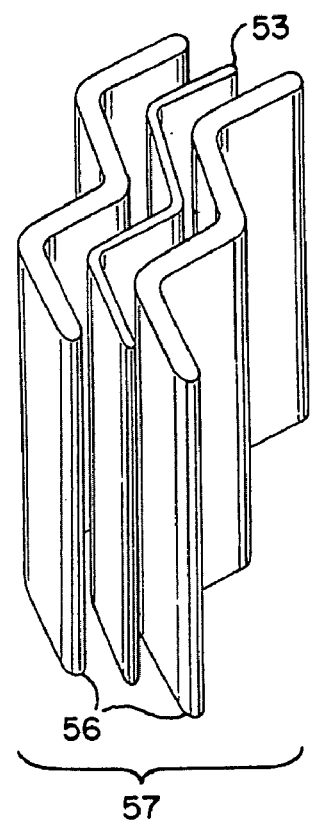
FIG. 10 is a perspective view of an electrode assembly prior to formation to fit within a housing, in accordance with the principles of the present invention.
Figure 11:
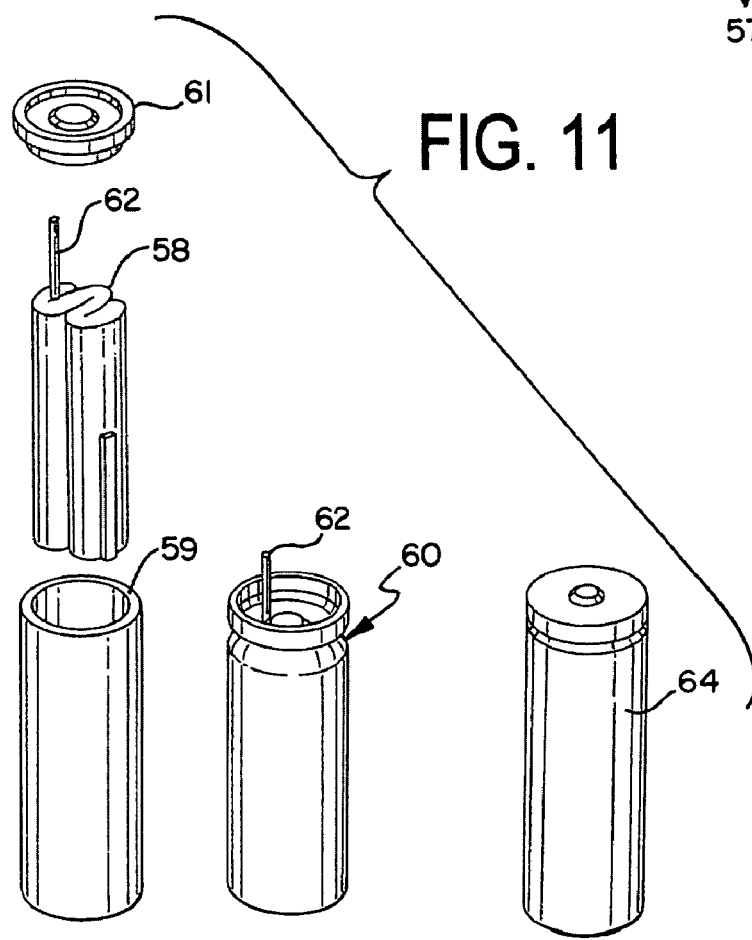
FIG. 11 is an assembly view of an embodiment in accordance with the principles of the present invention.

In an alternate embodiment as shown in FIG. 6, the inner electrode 43 and separator 44 can be embedded in an outer electrode material. In such an embodiment, the outer electrode material can be applied within the housing 41a after the inner electrode 43 is disposed therein, and pressed to form an embedded inner electrode 43 within the cathode material. Alternatively, the inner electrode 43 and separator 44 can be folded into a folded configuration, such as a "W" configuration, and then formed into a geometry generally conforming to the shape of the cell housing 41a. This inner electrode 43 can then be embedded into a cathode material 45 that is extruded into a geometry generally conforming to the shape of the cell housing 41a. The extruded cathode material/embedded anode results in an electrode assembly that can then be disposed within the cell housing 41a.

The present invention facilitates an increase in anode to cathode interfacial surface area such that the ratio of interelectrode surface area ($S_i$) to external surface area of the cell container or housing ($S_e$), i.e., $(S_i)/(S_e)$, may be in the range of 2 to 8 for a AAA or AA cell, (or possibly higher for larger diameter cell sizes like C or D) in order to markedly enhance high rate discharge characteristics. The increased interfacial area provides for a cell design with internal resistance that is a fraction of that of a bobbin cell constructed of equivalent materials. In the examples set forth herein below, the impedance measured at 1 KHz was 70% or less of that of a conventional bobbin cell. Power and energy content are better balanced so that the present invention retains greater than 70-80% of the energy content of a conventional bobbin at moderate rate while increasing the utilization at high power.

A particular embodiment of the present invention provides an inner electrode that has thinner average throughthickness measure than the equivalent inner electrode in a conventional bobbin cell. By thinning the inner electrode through-thickness the surface area can be increased significantly by lengthening the cross dimension so that approximately the same optimal anode to cathode cell balance can be maintained. The decreased through-thickness dimension of the inner electrode provides shorter diffusion lengths, which further enhances power capability of the cell. A conventional alkaline AA size bobbin cell has a cathode ring wall thickness of approximately 0.1 to 0.15 inches and an anode core thickness of approximately 0.2 to 0.3 inches, whereas an alkaline AA cell in accordance with the principles of the present invention may have a cathode thickness of approximately 0.035 to 0.070 inches and an anode thickness of only 0.020 to 0.060 inches.

Another benefit of the present invention is the increased utilization of the inner electrode at high discharge rates. A conventional bobbin cell has a low utilization at high rates because of the internal cylindrical geometry. As the discharge of the anode proceeds radially inwards from the inner surface of the separator, the anode to cathode interfacial surface area is constantly decreasing. This effectively increases the current density at the discharging inner electrode surface and leads to shutdown of the discharge reaction due to transport limitations. Increasing the surface area and thinning the inner electrode maintain a more uniform current density throughout the discharge leading to increased utilization of the inner electrode material.

In a preferred embodiment, the longitudinal dimensions of the inner and outer electrodes are approximately equal to the full internal height of the container minus the height required for the seal, which is typically at least 70% of the internal height so that the electrode composite occupies nearly the full length of the container and maximizes energy content. The outer electrode is preferably formed to be in direct contact with the interior surface of the housing and current collection from this outer electrode is principally via contact with and through the metal housing. The inner electrode is encased in separator and then embedded in an outer electrode matrix material, or sandwiched or formed with the inner electrode, wherein an insulated lead is brought out and then inserted into the housing so that the outer electrode contacts the inner surface of the housing.

In the case of an alkaline $MnO_2$/Zinc cell, to which many of the exemplifications herein refer, the zinc anode is the inner electrode and the $MnO_2$ cathode is the outer electrode which makes contact with the interior surface of the housing for a positive polarity contact. Note that while many examples herein consider the alkaline cell specifically, it is understood that the principles of the present invention can be applied to other electro-chemistries and formats.

According to a particular embodiment of the present invention, an alkaline manganese dioxide-zinc cell is provided comprising a manganese dioxide cathode, a zinc anode, a separator between the anode and cathode, and an aqueous alkaline potassium hydroxide electrolyte. The anode has a non-circular cross section with a short diffusion length relative to a conventional bobbin design anode such that the capacity of the active material is more distributed throughout the interior of the cross-section and cumulative cross-sectional perimeter which is more than twice the cell housing diameter. The anode is wrapped in separator and embedded in the cathode matrix which fills the space between the anode and the interior surface of the housing uniformly. The cell has a well-balanced ratio of power to energy and gets good capacity utilization at high discharge rate. In the case of a AA cell, this is exemplified by achieving greater than 1.2 Ah on a 1 Amp to 1 Volt discharge test.

In a preferred embodiment, the present invention provides a cell comprising a substantially planar or substantially flat separator encapsulated zinc anode and one or two planar shaped cathodes that are formed into a an accordion fold shape and then the whole cathode/anode assembly molded to fill the container.

The cathode structures are formulated such that they have the necessary physical integrity and electronic conductivity to permit handling in high speed production as well as to provide good electron transfer characteristics from the interior of the folds to the cell container wall. This can be accomplished by formulating the composite cathode with conductive fillers, reinforcing materials, binders or carrier webs. A particular means of achieving the necessary mechanical and electronic properties may be to apply a metal foil or mesh to the outer face of the cathode mass such that this metal structure provides an electronic contact to the interior surface of the housing and a continuous electrical connection to the interior of the folds.

Methods of manufacturing an electrochemical battery cell in accordance with the principles of the present invention are also contemplated, as should be apparent from the foregoing description. According to a particular aspect of the present invention, a method of manufacturing an electrochemical battery cell is provided comprising the steps of: (A) providing a battery cell housing including an interior space, a first terminal and a second terminal; (B) providing an inner electrode having a thin and substantially flat configuration and encapsulated by a separator; (C) providing an outer electrode having a thin and substantially flat configuration; (D) disposing the outer electrode adjacent the inner electrode; (E) folding the inner and outer electrodes together into a folded configuration; (F) forming the inner electrode such that an outer extent of the electrodes is generally conforming to a contour defined by the interior space of the cell housing; and (G) disposing the electrodes within the interior space of the housing such that the outer electrode is in electrical communication with the first terminal of the cell housing and the inner electrode is in electrical communication with the second terminal of the cell housing.

According to another particular aspect of the present invention, a method of manufacturing an electrochemical battery cell in the case of forming the outer electrode within the housing is also contemplated. The method comprises the steps of: (A) providing a battery cell housing including an interior space, a first terminal and a second terminal; (B) providing an inner electrode having a thin cross section in a linearly geometric configuration and encapsulated by a separator; (C) disposing the inner electrode within the interior space of the housing such that it is in electrical communication with the second terminal of the cell housing; (D) disposing an outer electrode material within the interior space of the cell housing such that the inner electrode is embedded therein and is in electrical communication with the first terminal of the housing; and (E) pressing the outer electrode material disposed within the interior space of the cell housing.

Other methods and variations of these particular methods are contemplated and are considered within the scope of the present invention when understood by one of ordinary skill in the art after consideration of the descriptions herein.

FIG. 7 illustrates the sequence whereby the preferred embodiment may be manufactured by a series of process steps from parts with simple geometries and low orientation requirements. In FIG. 7 (Step I), a planar cathode/separator-wrapped-anode/cathode stack is placed in a forming die, with the metal substrate on each cathode facing out from the stack. In FIG. 7 (Step II) and (Step III), shaped blades are pushed into the die cavity in a manner to cause folding and shaping of the stack. FIG. 7 (Step IV) shows the final shaping operation to compress and mold the stack into a cylinder prior to insertion in the housing or can.

In a particular embodiment in accordance with the principles of the present invention, a simple method of manufacturing is provided by which a preferred embodiment is achieved. According to a particular embodiment, two cathodes are formed onto die punched metal substrates and placed adjacent to a centrally placed separator encased anode structure. Thus positioned, the electrodes are intermingled and shaped by shaping dies applied perpendicular to the long axis of the electrodes. The final die is a concentric clamshell that forms the outer extent of the electrodes to conform to a contour or shape of the cell housing, such as a cylinder. After forming, the die opens slightly to allow the cylindrically formed integrated electrodes to be pushed into a cell housing positioned adjacent to the forming die. After the electrode assembly is in the housing, additional KOH electrolyte may be added to the top of the open housing for absorption into the electrodes as it passes to the next operation in sequence. The partially assembled cell at this stage has an approximately centrally placed insulated anode lead wire protruding from the top of the housing. This lead is passed through the center of a plastic bottom seal, and welded to an interior surface of a bottom cover, which is then oriented into its proper placement on the seal. Cell closing and finishing operations are equivalent to a conventional bobbin cell process.

The steps that form the improved cell design of the present invention can be readily translated to automated high-speed production. This formation sequence can be envisioned as replacing certain unit operations in a conventional bobbin cell manufacturing plant, with one or more of the steps being similar to those for conventional bobbin manufacturing. Cathode and gelled zinc anode mixing processes for example are expected to be reasonably similar as for conventional bobbin making. Certain of the modified bobbin assembly process operations may even be carried out with altered forms of the basic process equipment now used, with equivalent throughput rates.

To demonstrate and exemplify the principles of the present invention, several examples will now be given. The following examples apply to a general purpose $MnO_2/Zn$ AA cell that can provide greater runtime in a digital camera application, that is, the cell can deliver more capacity on a 1 Amp to 1 Volt discharge compared to a conventional $MnO_2/Zn$ AA cell. In addition the energy content of the cell is not excessively compromised such that reasonable capacity is still available at a moderate rate (3.9 ohm) discharge. Example cells were tested with a 1 Amp discharge to 0.8 Volt, recording the capacity achieved when the cell potential reaches 1 Volt, thereby simulating the ANSI digital camera test. After a 30 minute rest, there is an additional discharge step at 3.9 ohms to 0.7 volts. The 1 Amp to 1 Volt capacity ($C_{1V}$), total capacity delivered ($C_T$), and capacity ratio ($C_R$) tabulated below, are indications of the high rate and low rate capacity utilization efficiency. The data in Table 1 relates to the specific examples presented and shows that the invention increases utilization on the digital camera test while not affecting utilization on low rate tests, demonstrating the benefit of the present invention over the prior art.

TABLE 1

| Example Number | $C_{IV}$ (Ah) | $C_T$ (Ah) | $C_R$ |
| --- | --- | --- | --- |
| 1 | 1.2 | 2.0 | 0.60 |
| 2 | 1.1 | 1.8 | 0.61 |
| 3 | 1.2 | 1.9 | 0.63 |
| 4 | 1.35 | 2.0 | 0.68 |
| Conventional premium bobbin | 0.75 | 2.0 | 0.38 |

The examples refer to AA cells in Ni-coated steel cans of standard dimensions. The cathode formulation may be of any type that is typical of primary alkaline cells consisting of EMD ($\gamma$-$MnO_2$), conductive powder, and the remainder being other additives such as binders and electrolyte. The electrolyte is an aqueous alkaline solution of usually 4N to 12N potassium hydroxide. The electrolyte may contain dissolved zinc oxide, ZnO, surfactants and other additives, so as to reduce the gassing of the active zinc within the negative electrode.

The $MnO_2$ cathode premix formulation used in Examples I-IV consisted of a premix of Kerr-McGee High Drain EMD 69.4%, Acetylene Black 5.2%, KS-15 Graphite 2.6%, PTFE-30 Suspension 0.4%, and 9 N KOH 22.4%, on a weight basis. Mixing was carried out in a Readco mixer, ball mill, or other suitable mixer. The cathode premix was further mixed in the ratio of 100 g of mix to 1 g PTFE-30 suspension and 10 g of 9 N KOH solution in order to improve the pasting characteristics and for adhesion to the Ni substrate. The standard substrate was non-annealed expanded metal (Dexmet 3 Ni5-077). Seven grams of the cathode formula was pressed onto the substrate in a Carver press to give a cathode assembly thickness of about 0.047 inches. There was some loss of electrolyte (approx. 0.5 1.0 g) on pressing.

EXAMPLE 1

This is an example of the "embedded corrugated-fold" design as shown in FIGS. 5A-5D. In this example, a porous solid electroformed zinc is utilized as the anode. Referring generally to FIGS. 8-11 for all of the examples, a planar electroformed zinc is utilized as an anode subassembly 51 of approximately 1.5" W×1.625" H. The electroformed zinc anode sub-assembly 51 was formed by pasting a zinc oxide/binder slurry 63 onto a thin metal substrate 64 of silver or copper with an attached insulated lead 62 and then electroforming in an alkaline bath. The anode sub-assembly 51 was then washed and dried, and heat-sealed in a pouch of Scimat 700/70 separator 52 to form an anode assembly 55. The anode used was approximately 4.7 g in the dry state and 0.045 inches dry thickness including substrate and lead. The dry anode assembly 55 was soaked in 9 N KOH for at least one hour prior to being folded into a loose corrugated "W" shape 53. Two planar $MnO_2$ cathodes coated onto a perforated metal substrate 54 and with an overlay of 9 N KOH soaked KC16 absorber were placed, such that one was on each side of the anode and folded to conform as intermeshing "W's" 56, resulting in an electrode assembly in the form of a corrugated stack 57. The corrugated stack 57 was pressed and molded into a cylindrical shape 58 in a compression die with a 0.500 inch to 0.515 inch diameter bore prior to insertion into a cell housing or can 59. The thickness of the electrode stack 57 was adjusted so that it was not too thin to fill the can after forming or too thick so as become over compressed losing porosity and electrolyte on insertion into the can 59. After insertion into the can 59, a sealing bead 60 was formed in the upper part of the can 59. The anode lead 62 was attached to a lid 63 and the can was closed to form a complete cell 64.

EXAMPLE 2

This example illustrates the "embedded corrugated-fold" design shown in FIGS. 5A-5D, specifically utilizing pasted zinc in an anode sub-assembly. This anode is fabricated from zinc powder using an extrusion or pasting process to form an anode sheet. The anode sub-assembly was prepared by mixing powdered metallic zinc or zinc alloys and zinc oxide together with a Kraton binder and Shellsol solvent. The mixture was pasted onto a 0.002 inches thick perforated copper foil substrate with an attached lead and the solvent was allowed to evaporate. The sub-assembly was then wrapped in an SM700/70 separator to form the anode assembly. The dry anode assembly was soaked in 9 N KOH for at least one hour prior to being folded into a loose corrugated "W" shape. Two planar $MnO_2$ cathodes coated onto a perforated metal substrate and with an overlay of 9 N KOH soaked KC16 absorber were placed, such that one was on each side of the anode and folded to conform as intermeshing "W's." The corrugated stack was pressed and molded into a cylindrical shape in a compression die with a 0.500 inch to 0.515 inch diameter bore prior to insertion into the housing or can. The thickness of the electrode stack was adjusted so that it was not too thin to fill the can after forming or too thick so as become over compressed losing porosity and electrolyte on insertion into the can. After insertion into the can, a sealing bead was formed in the upper part of the can. The anode lead was attached to the lid and the can was closed to form a complete cell.

EXAMPLE 3

This example illustrates the "embedded corrugated-fold" design shown in FIGS. 5A-5D utilizing zinc gel to form the anode assembly. The zinc gel comprised powdered metallic zinc or zinc alloys and optionally zinc oxide together with a suitable gelling agent such as carboxymethyl cellulose, polyacrylic acid, starches, and their derivatives. An anode current collector with an attached lead was placed in a pouch prepared out of the Scimat SM700/79 separator and 7 g of the gel was added into the pouch which was then heat sealed at the bottom to form the anode assembly. Two planar $MnO_2$ cathodes coated onto a perforated metal substrate and with an overlay of 9 N KOH soaked KC16 absorber were placed, such that one was on each side of the anode assembly and folded to conform as intermeshing "W's." The corrugated stack was pressed and molded into a cylindrical shape in a compression die with a 0.500 inch to 0.515 inch diameter bore prior to insertion into the housing or can. The thickness of the electrode stack was adjusted so that it was not too thin to fill the can after forming or too thick so as become over compressed losing porosity and electrolyte on insertion into the can. After insertion into the can, a sealing bead was formed in the upper part of the can. The anode lead was attached to the lid and the can was closed to form a complete cell.

EXAMPLE 4

This example illustrates the "embedded corrugated-fold" design shown in FIGS. 5A-5D utilizing zinc gel with added zinc fibers to form the anode assembly. The zinc gel comprised powdered metallic zinc or zinc alloys, 5% of Alltrista ⅛" zinc fibers, and optionally zinc oxide together with a suitable gelling agent such as carboxymethyl cellulose, polyacrylic acid, starches, and their derivatives. An anode current collector with attached lead was placed in a pouch prepared out of a Scimat SM700/79 separator and 7 g of the gel/fiber mix was added into the pouch which was then heat sealed at the bottom to form the anode assembly. Two planar $MnO_2$ cathodes coated onto a perforated metal substrate and with an overlay of 9 N KOH soaked KC16 absorber were placed, such that one was on each side of the anode assembly and folded to conform as intermeshing "W's." The corrugated stack was pressed and molded into a cylindrical shape in a compression die with a 0.500 inch to 0.515 inch diameter bore prior to insertion into the housing or can. The thickness of the electrode stack was adjusted so that it was not too thin to fill the can after forming or too thick so as become over compressed losing porosity and electrolyte on insertion into the can. After insertion into the can, a sealing bead was formed in the upper part of the can. The anode lead was attached to the lid and the can was closed to form a complete cell.

Other manifestations of the "embedded corrugated-fold" design of the present invention are anticipated. For example the assembly and process variables such as: anode weight, anode soak time, degree of compression, cathode formulation, cathode substrate, and cathode-to-can current collection can be "fine tuned" to maximize electrical performance of the embedded "W" design. Almost all of the cells were built with the 0.515 inch diameter compression die which was adapted over the previous standard 0.5 inch diameter die based largely on the clear observation that less electrolyte is squeezed out during assembly. It is important to retain enough electrolyte in the cell to facilitate performance.

It is also possible to vary the length of the electrodes or length and number of folds to provide more optimal surface area and filling of the container, than given in the W-fold described in the examples. Rather than using two outer cathode assemblies, a single length of cathode may be wrapped around the separator-encased anode and then folded into a corrugated structure. An alternate means to increase surface area is for multiple layers of cathode and anode to be used in the stack to be corrugated, for example: cathode/anode/cathode/anode/cathode.

PRISMATIC CELL EMBODIMENTS

Based on the description above, it should be understood by one of ordinary skill in the art that the principles of the present invention may be embodied in any type of cell configuration, including prismatic or free-form cell configurations. Nevertheless, for purposes of further exemplification, several prismatic cell embodiments will now be described in more detail.

Figure 12A:
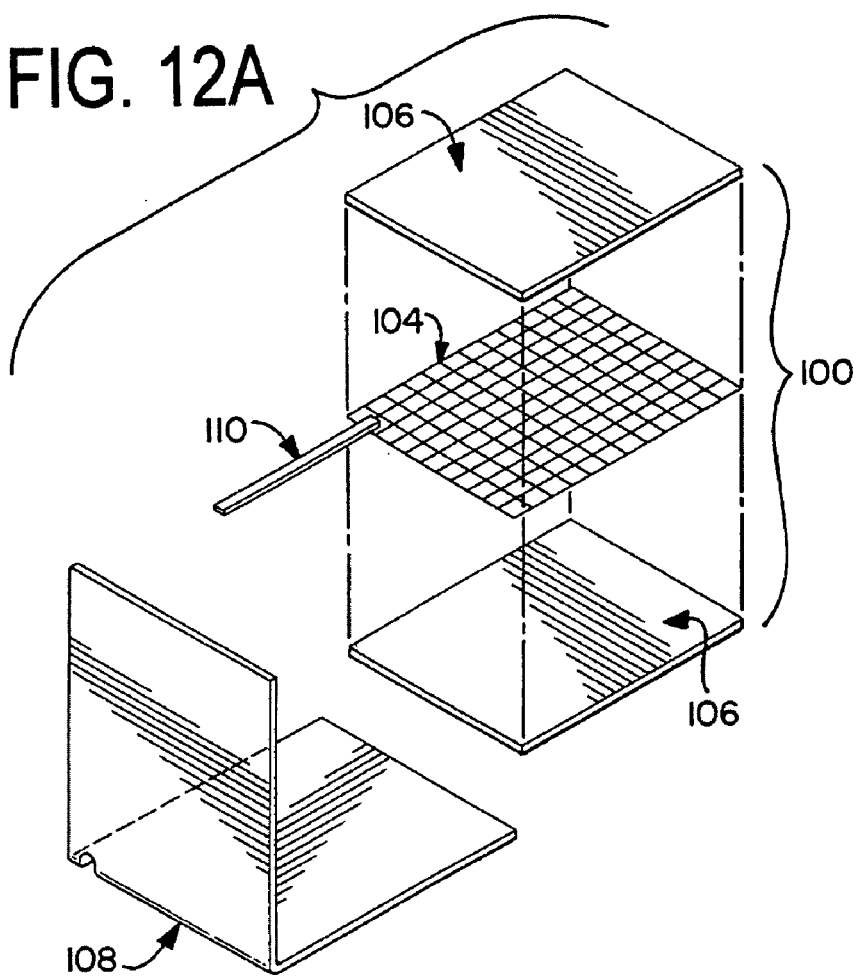
FIG. 12A is an assembly view of an inner electrode assembly in accordance with the principles of the present invention.
Figure 12B:
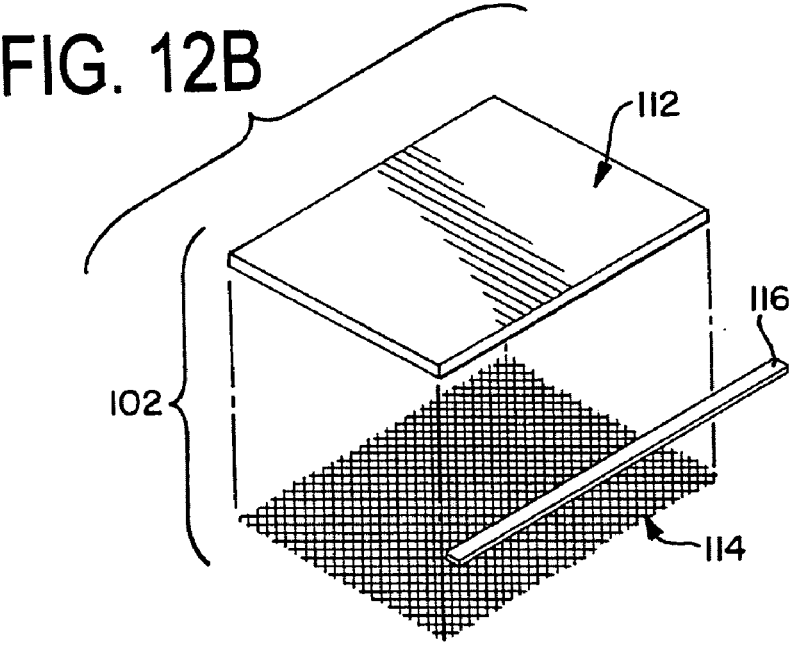
FIG. 12B is an assembly view of an outer electrode assembly in accordance with the principles of the present invention.

Referring generally now to FIGS. 12A and 12B, a substantially flat inner electrode 100 (FIG. 12A) and a substantially flat outer electrode 102 (FIG. 12B) are provided. The inner electrode 100 shown in FIG. 12A is constructed for use as an anode, which comprises an anode current collector 104 surrounded by zinc gel layers 106 and encapsulated by a separator 108. An insulated electrical lead 110, which is attached to the anode, passes through the separator 108 to facilitate electrical connection of the inner electrode within a battery cell. The outer electrode 102 shown in FIG. 12B is constructed as a cathode, which comprises a cathode material layer 112 and a current collector 114. The outer electrode 102 includes an insulated electrical lead 116 to facilitate electrical connection of the outer electrode within a battery cell. While the inner electrode is preferably configured as an anode and the outer electrode is preferably configured as a cathode, such as that shown in FIGS. 12A and 12B, it should be understood that both the inner electrode and outer electrode can be configured as either a cathode or an anode.

The inner and outer electrodes 100 and 102 can be constructed in many different shapes depending on the particular application. Preferably, the inner and outer electrodes 100 and 102 are constructed in a substantially flat configuration having a rectilinear periphery. The electrodes 100 and 102 can then be formed together to fit within and conform to a particular cell housing (sometimes referred to herein as a can), such as a prismatic cell housing.

Figure 13A:
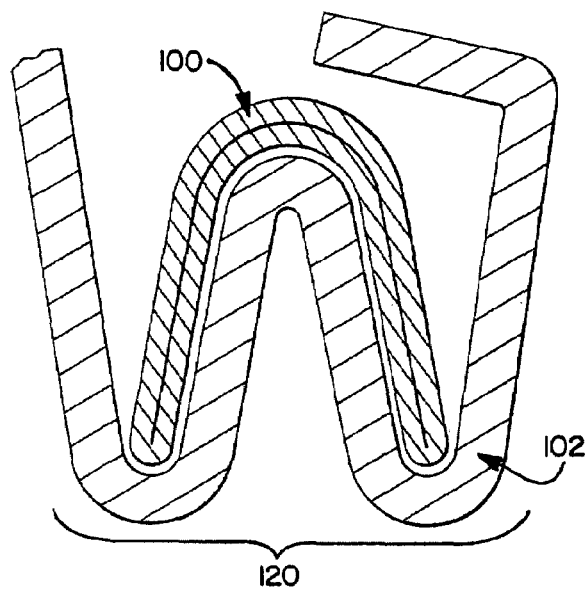
FIG. 13A is a cross-sectional plan view of an embodiment of a folded electrode assembly in accordance with the principles of the present invention.
Figure 13B:
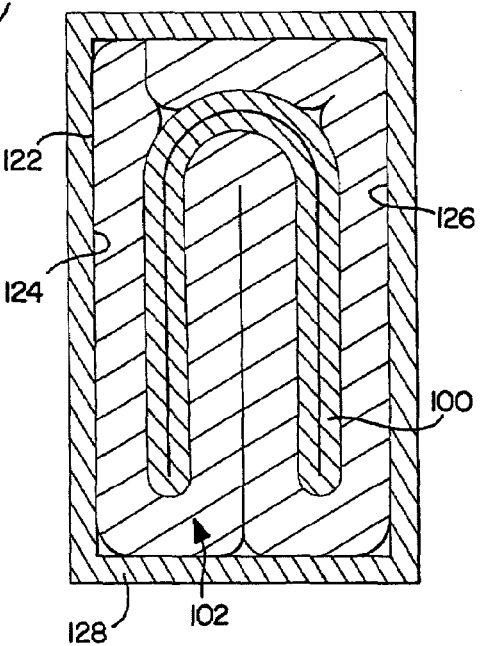
FIG. 13B is a cross-sectional plan view of the folded and formed electrode assembly of FIG. 13A disposed within a prismatic cell housing in accordance with the principles of the present invention.
Figure 13C:
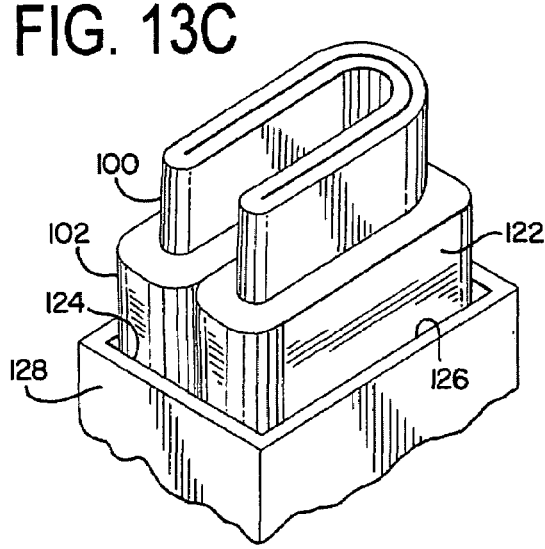
FIG. 13C is a partial perspective view of the embodiment depicted in FIG. 13B.

Referring to FIGS. 13A-13C, the electrodes 100 and 102 are shown folded and formed to conform to a prismatic, or rectilinear, cell housing. Referring particularly to FIG. 13A, the electrodes 100 and 102 are preferably folded together to create intimate contact therebetween, thereby forming an electrode assembly 120. In this particular embodiment, the electrodes 100 and 102 are folded in a W-like configuration, as shown in FIG. 13A. However, as will be apparent from other embodiments disclosed herein, the electrodes 100 and 102 can be folded together in any type of configuration providing adequate surface area interaction between the electrodes 100 and 102.

Referring now to FIGS. 13B and 13C, the electrodes 100 and 102 of the electrode assembly 120 are formed such that an outer extent 122 of the outer electrode 102 is generally conforming to a contour 124 defined by an interior surface 126 of a cell housing 128. In this particular embodiment, the outer extent 122 of the outer electrode 102 is formed by pressing it to conform to a generally rectilinear contour. As shown in FIG. 13B, this forming results in substantial utilization of the interior space of the cell housing and also results in good surface contact between the interior surface 126 of the cell housing and the outer electrode 102, which facilitates electrical connection of the outer electrode to a terminal of the battery cell in embodiments where the interior surface 126 is in electrical communication with a terminal of the battery cell. In a preferred embodiment, the outer extent 122 of the electrode 102 is formed such that it is substantially conforming to the contour 124 defined by the interior surface 126 of the cell housing and making substantially void-free contact therewith, as shown in FIG. 13B.

Referring to FIGS. 14A-14B, another embodiment is shown with a different folded configuration between the electrodes 100 and 102. Rather than folding the electrodes 100 and 102 in a W-like configuration as that shown in FIG. 13A, the electrodes 100 and 102 shown in FIG. 14A are folded in a tri-fold configuration to form an electrode assembly 130. As shown in FIG. 14B, the electrode assembly 130 is formed such that an outer extent 132 of the outer electrode 102 is generally conforming to a contour 134 defined by an interior surface 136 of a cell housing 138. As shown in FIG. 14B, this forming results in substantial utilization of the interior space of the cell housing and also results in substantially void-free surface contact between the interior surface 136 of the cell housing and the outer electrode 102.

Referring to FIGS. 15A-15D, yet another embodiment is shown wherein a first set of inner and outer electrodes 140 and 142 are folded together to create a first electrode assembly 144 and a second set of electrodes 146 and 148 are folded together to create a second electrode assembly 150. This two-assembly configuration facilitates use with a cell housing 151 that includes one or more internal structural members 152, which are shown in FIGS. 15B and 15C. These structural members 152 are utilized to reduce deflection and bulging of the cell housing due to swelling and internal pressure without the need for increasing wall thickness of the cell housing. The structural members 152 are preferably Niplated steel. These internal structural members 152 may be spot-welded to the interior surfaces of the housing, either before or after introduction of the electrode assemblies, effectively reducing the beam length between supports. In this manner they can act in tension to reduce the deflection and bulging of the case wall due to swelling and internal pressure. The internal members 152 do not need to be electrically insulated from the cathode mass, which in any case is in contact with the interior surface of the housing. This type of design is one way that thinner walled housings might be utilized with a corresponding increase in the energy content.

Figure 16:
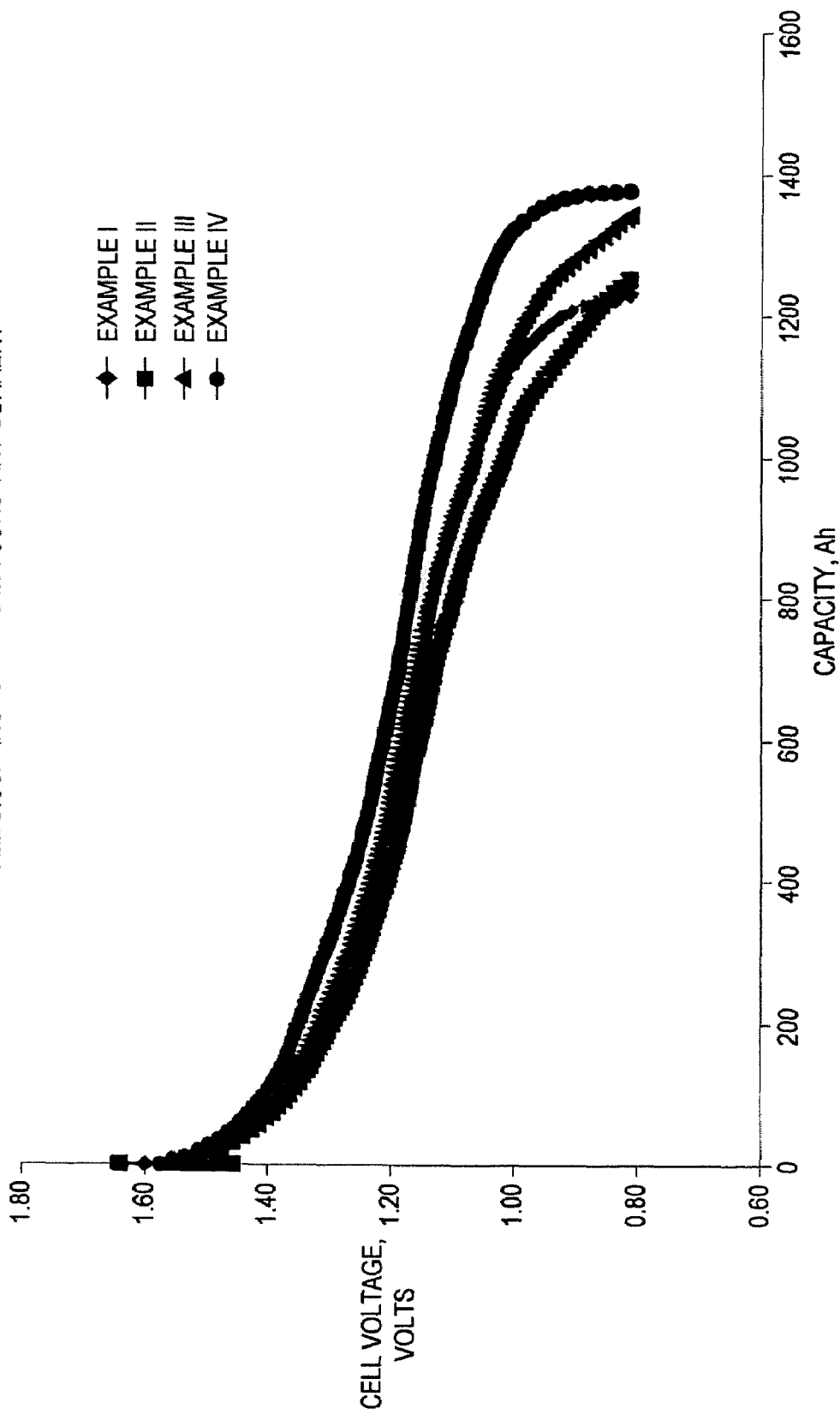
FIG. 16 is a graph depicting cell discharge curves for the prismatic cells of examples 5, 6, 7 and 8 as described herein.

Several examples of a prismatic cell construction in accordance with the present invention will now be described, which illustrate some of the performance characteristics of such cell construction. The examples apply to a general purpose $MnO_2$/Zn cell in an IEC 7/5 F6 prismatic size (6 mm×17 mm×67 mm, 0.33 mm wall thickness, internal dimensions of approximately 15.74 mm×63.80 mm×4.95 mm) that can deliver high capacity on a 0.5 to 2 Amp discharge. In addition the energy content of the cell is not excessively compromised such that reasonable capacity is still available at a low to moderate rate discharge. Example cells were tested and the data shows that the invention increases utilization at higher discharge rates while not substantially affecting utilization on low rate tests. FIG. 16 shows the discharge curves for each of the examples. The examples refer to cells that may be packaged in Ni-coated steel cans of standard dimensions, appropriate to the given cell formats. The cathode formulation may be of any type that is typical of primary alkaline cells consisting of EMD ($\gamma$-$MnO_2$), conductive powder, and the remainder being other additives such as binders and electrolyte. The electrolyte is an aqueous alkaline solution of usually 4N to 12N potassium hydroxide. The electrolyte may contain dissolved zinc oxide (ZnO), surfactants and other additives, so as to reduce the gassing of the active zinc within the negative electrode.

The $MnO_2$ cathode formulation used in the examples consisted of a premix of Kerr-McGee High Drain EMD 72.6%, KS-15 Graphite 8.2%, PTFE-30 Suspension 0.4%, and 9 N KOH 18.8%, on a weight basis. The cathode structures are formulated such that they have the necessary physical integrity and electronic conductivity to permit handling in high speed production as well as to provide good electron transfer characteristics from the interior of the folds to the cell container wall. This can be accomplished by formulating the composite cathode with conductive fillers, reinforcing materials, binders or carrier webs. A particular means of achieving the necessary mechanical and electronic properties may be to apply a metal foil or mesh to the outer face of the cathode mass such that this metal structure provides an electronic contact to the container wall and a continuous electrical connection to the interior of the folds. Mixing was carried out in a Readco mixer, ball mill, or other suitable mixer to provide suitable pasting characteristics for adhesion to the Ni substrate. The standard substrate was non-annealed expanded metal (Dexmet 3 Ni5-077).

In the following examples, zinc gel has was utilized to form the anode assembly of the cells.

In all of the Examples, the longitudinal dimensions of the inner and outer electrodes are approximately equal to the full internal height of the container minus the height required for the seal, which is typically at least 70% of the internal height so that the electrode composite occupies nearly the full length of the container and maximizes energy content. For the prismatic cell, the cathode weight was approximately 11 g and thickness about 0.041 inches. There was some loss of electrolyte (approx. 0.5 1.0 g) on pressing.

EXAMPLE 5

Figure 17A:
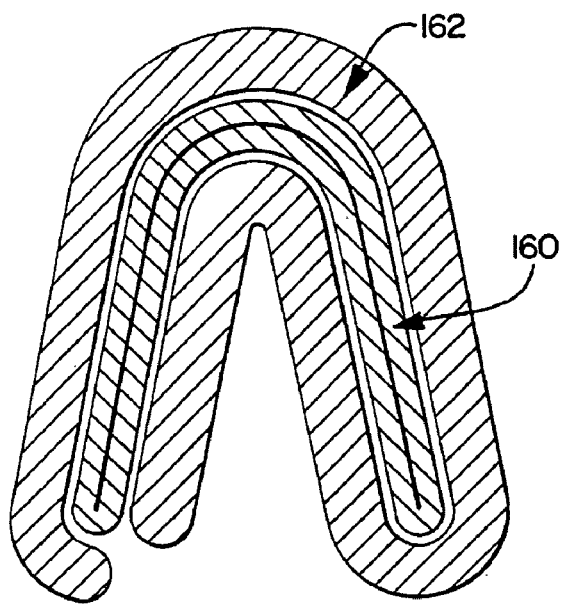
FIG. 17A is a cross-sectional plan view of an embodiment of a folded electrode assembly utilized in examples 5, 6, 7 and 8 as described herein and in accordance with the principles of the present invention.
Figure 17B:
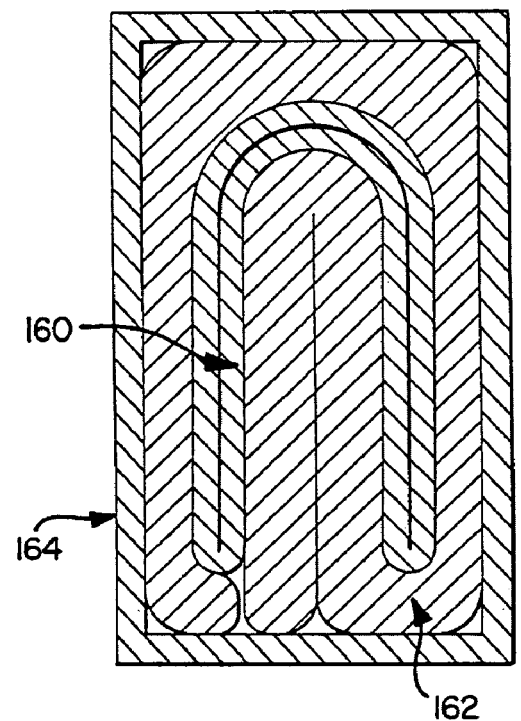
FIG. 17B is a cross-sectional plan view of the folded and formed electrode assembly of FIG. 17A disposed within a prismatic cell housing in accordance with the principles of the present invention.

A test cell utilizing an electrode assembly of the present invention was fabricated and tested. The zinc gel comprised powdered metallic zinc or zinc alloys and optionally zinc oxide together with a suitable gelling agent such as carboxymethyl cellulose, polyacrylic acid, starches, and their derivatives. A separator pouch of approx. 28 mm×62 mm prepared out of Scimat SM700/79 separator containing a tin coated steel substrate was filled with approximately 5 g of zinc gel formulation consisting of 65% zinc powder, 34.5% KOH and 0.5% carbopol to form the anode assembly. A planar $MnO_2$ cathode coated onto an expanded metal substrate of 60 mm×62 mm was wrapped around the anode using the fold configuration shown in FIGS. 17A and 17B (anode 160, cathode 162, housing or case 164). The cathode assembly weight was 11.11 g. Anode and cathode leads welded to their respective substrates were brought out from opposite ends of the case. This cell when discharged at a constant current of 500 mA to 0.8 Volts yielded a capacity of 1.22 Ah.

EXAMPLE 6

A second test cell utilizing an electrode assembly of the present invention was fabricated and tested. The zinc gel comprised powdered metallic zinc or zinc alloys and optionally zinc oxide together with a suitable gelling agent such as carboxymethyl cellulose, polyacrylic acid, starches, and their derivatives. A separator pouch of approx. 28 mm×62 mm prepared out of Scimat SM700/79 separator containing a tin coated steel substrate was filled with approximately 5 g of zinc gel formulation consisting of 65% zinc powder, 34.5% KOH and 0.5% Carbopol to form the anode assembly. A planar $MnO_2$ cathode coated onto an expanded metal substrate of 60 mm×62 mm was wrapped around the anode using the fold configuration shown in FIGS. 17A and 17B. The cathode assembly weight was 10.82 g. Anode and cathode leads welded to their respective substrates were brought out from opposite ends of the case. This cell when discharged at a constant current of 500 mA to 0.8 Volts yielded a capacity of 1.25 Ah.

EXAMPLE 7

A third test cell utilizing an electrode assembly of the present invention was fabricated and tested. The zinc gel comprised powdered metallic zinc or zinc alloys and optionally zinc oxide together with a suitable gelling agent such as carboxymethyl cellulose, polyacrylic acid, starches, and their derivatives. A separator pouch of approx. 28 mm×62 mm prepared out of Scimat SM700/79 separator containing a tin coated steel substrate was filled with approximately 4.5 g of zinc gel formulation consisting of 65% zinc powder, 34.5% KOH and 0.5% Carbopol to form the anode assembly. A planar $MnO_2$ cathode coated onto an expanded metal substrate of 60 mm×62 mm was wrapped around the anode using the fold configuration shown in FIGS. 17A and 17B. The cathode assembly weight was 10.14 g. Anode and cathode leads welded to their respective substrates were brought out from opposite ends of the case. This cell when discharged at a constant current of 500 mA to 0.8 Volts yielded a capacity of 1.33 Ah. EXAMPLE 8 A fourth test cell utilizing an electrode assembly of the present invention was fabricated and tested. The zinc gel comprised powdered metallic zinc or zinc alloys and optionally zinc oxide together with a suitable gelling agent such as carboxymethyl cellulose, polyacrylic acid, starches, and their derivatives. A separator pouch of approx. 28 mm×62 mm prepared out of Scimat SM700/79 separator containing a tin coated steel substrate was filled with approximately 4.5 g of zinc gel formulation consisting of 65% zinc powder, 34.5% KOH and 0.5% Carbopol to form the anode assembly. A planar $MnO_2$ cathode coated onto an expanded metal substrate of 60 mm×62 mm was wrapped around the anode using the fold configuration shown in FIGS. 17A and 17B. The cathode assembly weight was 11.57 g. Anode and cathode leads welded to their respective substrates were brought out from opposite ends of the case. This cell when discharged at a constant current of 500 mA to 0.8 Volts yielded a capacity of 1.37 Ah.

The discharge voltage curves for the four example cells are illustrated in FIG. 16. In all of the examples above the capacity delivery to a 0.8 V cutoff is greater than would be anticipated from a standard construction alkaline cell in the 7/5 F6 format. As a comparison, recently reported capacity for a prismatic alkaline cell of this size when discharged at 500 mA to 0.8 V, was 1.08 Ah. Cells constructed according to the present invention delivered 15 30% better capacity.

Other manifestations of the design of the present invention are anticipated. For example, the assembly and process variables such as: anode weight, anode soak time, degree of compression, cathode formulation, cathode substrate, and cathode-to-can current collection can be "fine tuned" to maximize electrical performance of the embedded "U" design. It is also possible to vary the length of the electrodes or length and number of folds to provide more optimal surface area and filling of the container, than given in the folded cells described in the examples.

OTHER EMBODIMENTS AND METHODS OF MANUFACTURING

As should be apparent to one of ordinary skill in the art from the foregoing description, the principles of the present invention can be applied in many different embodiments and implemented through many different methods of manufacturing and assembly. To further exemplify these principles and their broad scope of application, additional methods of manufacturing and embodiments of cells conducive to these methods will now be described.

As previously described herein, one particular embodiment of a cell of the present invention utilizes a planar electrode stack that is folded into a corrugated structure (or other folded configuration) and is then formed or molded to fit the cell container or housing. This type of embodiment has been shown to increase the anode to cathode interfacial surface area and provides increased power relative to a simple bobbin cell known in the art. Although methods of manufacturing cells of this type have been previously described herein, embodiments having this type of structure can be formed by other methods as well, which may be more cost effective and more conducive to manufacturability.

Methods that utilize a granulated form of outer electrode material, such as a cathode material formulation, have been shown to be more cost effective and more conducive to manufacturability. Although the granulated form of outer electrode material has been previously described herein, various methods of manufacturing of embodiments utilizing this form will now be described in more detail for purposes of further exemplification of such embodiments.

The outer electrode material formulation, such as a cathode formulation, is easily mixed in a granulated form and can be easily stored in such a state prior to further processing, such as being pressed into molded rings or pellets, either externally or internally to the cell container. By utilizing a granulated form of outer electrode material, any broken pellets or other material loss can be easily fed back to the mixing or granulation stage of processing for rework, thereby further reducing manufacturing costs. This is one significant advantage over the use of sheeted or substrate forms of outer electrodes, where scrap rates can be higher due to increased dimensional and mechanical integrity constraints associated with conventional outer electrode substrate structures.

Figure 18A:
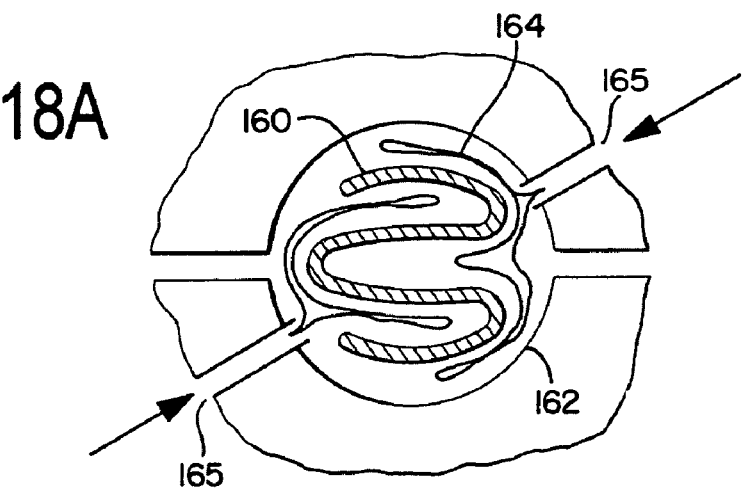
FIG. 18A is a schematic diagram depicting aspects of a method of manufacturing in accordance with the principles of the present invention.

Referring now to FIG. 18A, a method incorporating insert molding of an outer electrode material will now be described. In this embodiment, the outer electrode material serves as a cathode. As shown schematically in FIG. 18A, a separator-encased anode 160 as previously described herein is placed into a formation die 162. A granulated or powder cathode material 164 in the form of a slurry or paste is injected into the die 162 via one or more injection ports 165 and forced to surround the anode 160. The die 162 is preferably designed in accordance with conventional injection-molding, compression molding, casting, or extrusion techniques and the cathode material 164 can be injected into the die via pressure created by a mold press, such as a piston or ram type of press, or any other type of mechanism known in the relevant art to create pressure sufficient for proper filling, packing and distribution of the cathode material 164 in the die 162. After the dies has been properly filled with the appropriate amount of the cathode material 164, and depending on the particular molding technique being utilized, the die may be further compressed to form the electrode assembly having the appropriate density and dimensions. Any number and type of additives can be introduced at any point in the process, such as, for example, additional electrolyte. In a preferred embodiment, a pasted anode arrangement is utilized as previously described herein, which is essentially dry. Thus, the addition of electrolyte and the use of an extra-wet cathode material to accommodate formation can be counter-balanced by use of such a pasted anode arrangement. It should also be understood that the die 162 can be implemented in any type of molding process, such as, for example, injection or compression molding, extrusion, casting, or the like, or any combination thereof. In a preferred embodiment, the die 162 is utilized in an extrusion molding process to form the electrode assembly having the inner electrode inserted during the molding process. The resulting electrode assemblies can then be utilized in the manufacturing of a complete battery cell.

Figure 18B:
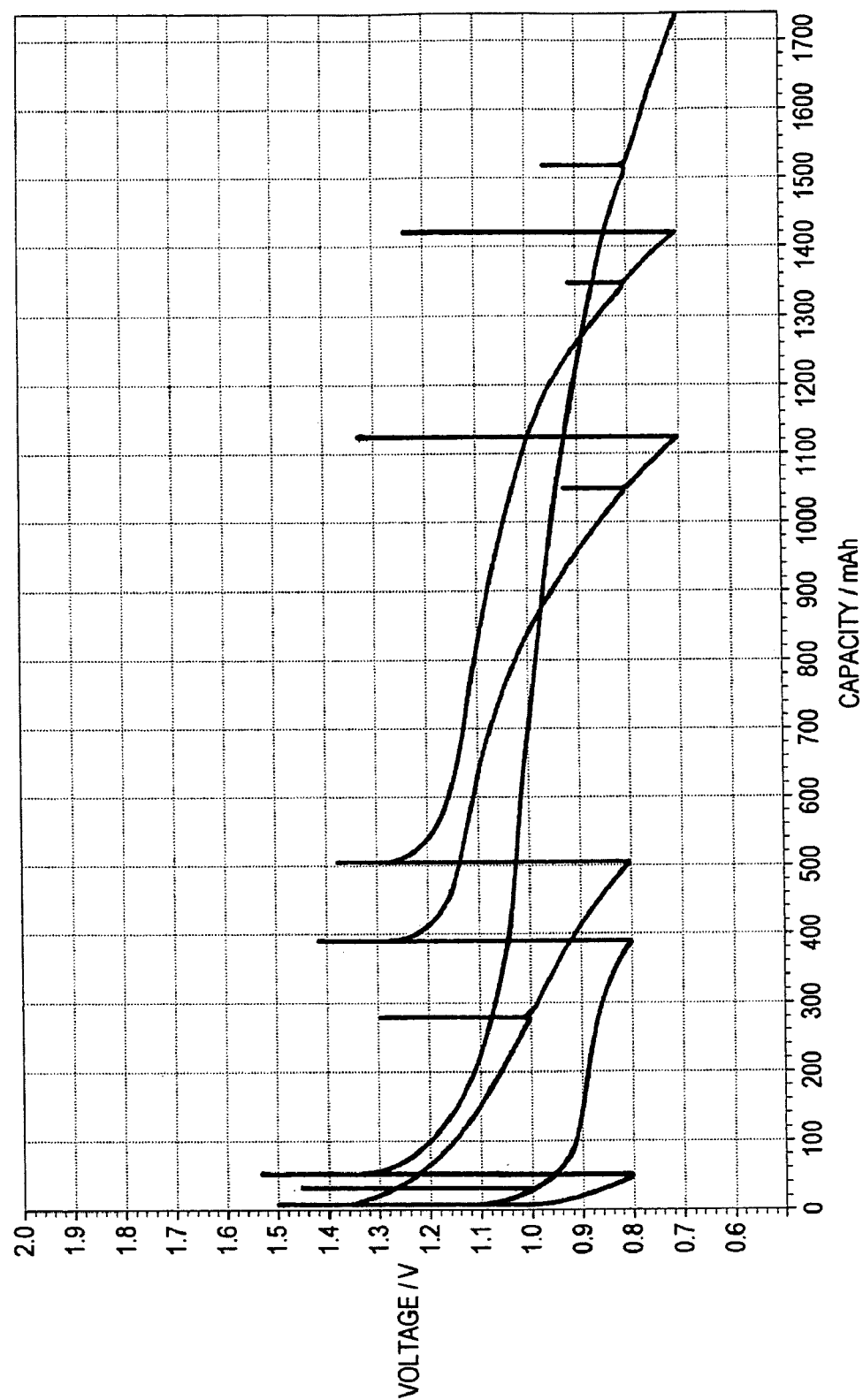
FIG. 18B is a graph depicting performance characteristics of cells manufactured according to the method of FIG. 18A.

FIG. 18B illustrates discharge curves for three cells formed by this method. The $MnO_2$ cathode formulation used in these cells consisted of a premix of Kerr-McGee High Drain EMD 72.6%, KS-15 Graphite 8.2%, PTFE-30 Suspension 0.4%, and 9 N KOH 18.8%, on a weight basis. A separator pouch was prepared out of Scimat SM700/79 separator containing a tin coated steel substrate was filled with approximately 6 g of zinc gel formulation consisting of 65% zinc powder, 34.5% KOH and 0.5% carbopol to form the anode assembly. A 20 mm×40 mm pouch was prepared and folded into a V shape and 10.8 g of cathode was extruded around the V-shaped anode. This cell was discharged at a constant current of 1 Amp to 0.8 Volts and yielded a capacity of 0.39 Ah, and on further discharge over a 3.9 ohm resistor to 0.7 Volts yielded a cumulative capacity of 1.12 Ah. For a similarly configured cell into which 11.2 g of cathode was extruded, when discharged at a constant current of 1 Amp to 0.8 Volts, the cell yielded a capacity of 0.0.5 Ah and on further discharge over a 3.9 ohm resistor to 0.7 Volts yielded a cumulative capacity of 1.12 Ah. For a cell in which a 40 mm×40 mm pouch was prepared and folded into a W shape, with approx. 12 g of cathode extruded around the W-shaped anode, this cell when discharged at a constant current of 1 Amp to 0.8 Volts yielded a capacity of 0.05 Ah and on further discharge over a 3.9 ohm resistor to 0.7 Volts yielded a cumulative capacity of 1.74 Ah.

Referring now to FIG. 19A, yet another method of electrode formation is illustrated. In this embodiment, the outer electrode material serves as a cathode. In this method, granular or powder cathode material is pressed and stacked around a separator-encased anode in a sequence of steps or stages prior to being folded. As shown in FIG. 19A, in a first stage a first portion of the cathode material 170 is metered into a die 172 and then pressed in a substantially flat configuration. A separator-encased anode 174 is then placed on top of the pressed first portion of cathode material 170. A remaining portion 176 of cathode material is placed on top of the anode 172 and then pressed into a substantially flat configuration to form a subassembly 178 in a "sandwich" form, as shown in FIG. 19A. This "sandwich" subassembly 178 is then folded and compressed into a corrugated form, which can then be inserted into a cell container during manufacturing of a complete battery cell. In a preferred embodiment, the anode 172 may be pre-folded into a corrugated or other folded configuration and then re-flattened, which makes final forming easier. In a preferred embodiment, a rotary press may be utilized to facilitate the forming stages.

In a variation of the method illustrated in FIG. 19A, a flexible, non-metallic substrate, such as a non-woven polymer membrane may be inserted into the die at certain stages such that it is disposed on the outside of the resulting stack, which provides additional mechanical integrity to the outer electrode. The non-woven substrate may be coated with a conductive carbon ink to impart electrical conductivity.

Figure 19B:
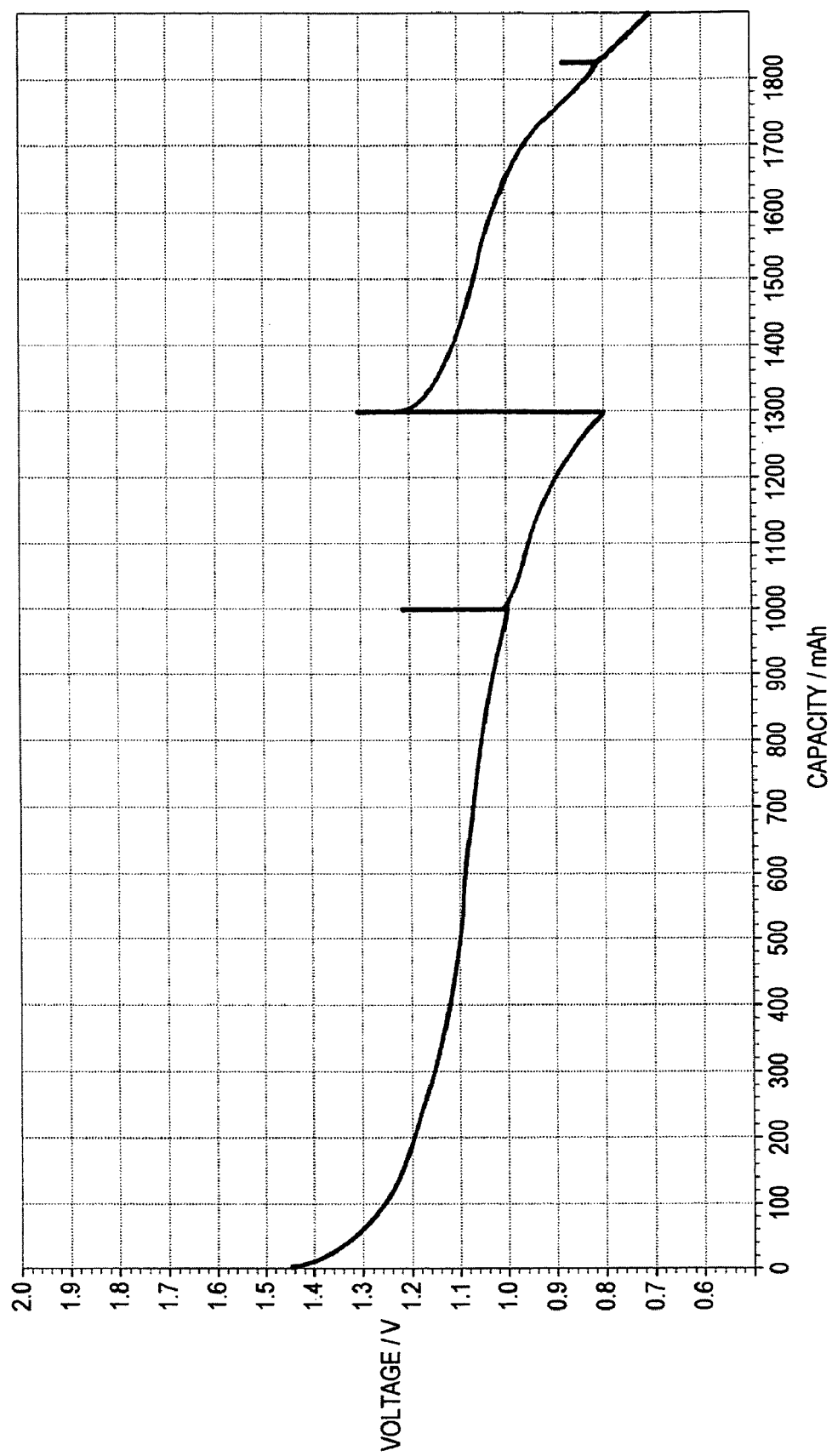
FIG. 19B is a graph depicting performance characteristics of a cell manufactured according to the method of FIG. 19A.

FIG. 19B illustrates discharge curves for a cell formed by this method. The $MnO_2$ cathode premix formulation used consisted of a premix of Kerr-McGee High Drain EMD 56.5%, Superior Graphite ABG1010 graphite 5.2%, PTFE-30 Suspension 0.3%, and 9 N KOH 38%, on a weight basis. A separator pouch of 40 mm×40 mm was prepared out of Scimat SM700/79 separator containing a tin coated steel substrate and was filled with approximately 6.5 g of zinc gel formulation consisting of 65% zinc powder, 34.5% KOH and 0.5% carbopol to form the anode assembly. The anode was pre-folded into the shape of a W and then the cathode material was divided into 3 approximately equal portions of 3.4 g each being pressed into the V-shaped grooves of the folded anode. An additional small portion of cathode of approximately 2 g total weight was coated onto the interior upper and lower surfaces of a 0.520 inch compression die into which the electrode assembly was placed for compression prior to inserting into a AA size can. This cell when discharged at a constant current of 1 Amp to 1 Volt yielded a capacity of 1.0 Ah and on further discharge over a 3.9 ohm resistor to 0.7 Volts a cumulative capacity of 1.9 Ah.

FIG. 19C illustrates a discharge curve for a cell formed by methods similar to those described with respect to FIG. 19A. In this cell, a carbon-coated absorber was utilized in connection with the cathode material, rather than an expanded metal substrate. A cathode formulation consisting of a premix of Kerr-McGee High Drain EMD 71.4%, Superior Graphite ABG1010 graphite 6.6%, PTFE-30 Suspension 0.4%, and 9 N KOH 21.6%, on a weight basis was utilized and pressed onto a carbon coated absorber laid flat in a pressing die. A 13.5 g total of cathode material was used divided into 2 equal portions. The cathode/anode/cathode sandwich was folded into a W shape and compressed in a 0.520 inch compression die. This cell when discharged at a constant current of 1 Amp to 1 Volt yielded a capacity of 1.12 Ah and on further discharge over a 3.9 ohm resistor to 0.7 Volts a cumulative capacity of 1.76 Ah.

FIG. 20A illustrates yet another method and associated embodiment. In this embodiment, the outer electrode material serves as a cathode. In this embodiment, a first portion of a cathode material is molded to form a ring 182 around a wall 184 of a cell housing 185. The cathode ring 182 is formed via methods that are well known in conventional alkaline bobbin cell manufacturing. For example, the cathode ring 182 may be molded externally to the cell housing or directly molded into the housing. The cathode ring 182 may also be compacted against the housing wall 184 to ensure good contact therewith. In this method, a fraction of the total cathode material for the cell is utilized to form the ring 182, such as, for example, 20-60% of the total cathode material. The ring 182 establishes effective contact with the housing wall 184 and creates an interior space of the ring within the housing, which also defines an interior surface 186 for contact with a folded inner electrode 188, such as a separator-encased anode. A remaining portion 190 of the cathode material is distributed around the folded inner electrode and is compressed together to form an electrode sub-assembly 192 that complies with a contour of the ring 182. The sub-assembly can then be inserted into the ring 182 within the cell housing 185 during manufacturing of the battery cell.

Figure 20C:
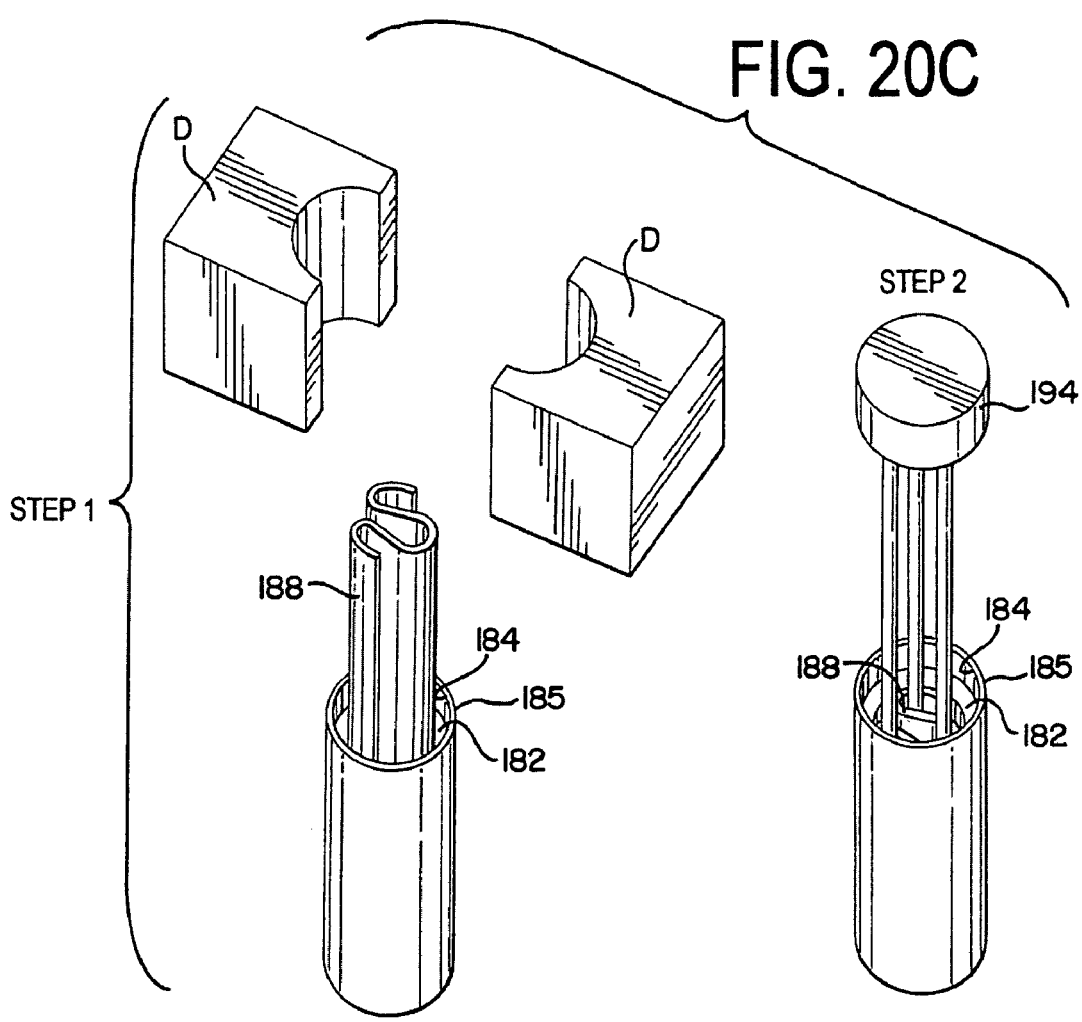
FIG. 20C is a schematic diagram depicting various steps associated with manufacturing the cell depicted in FIG. 20B.

FIGS. 20B and 20C illustrate an alternate form of the method depicted in FIG. 20A wherein the electrode subassembly 192 is formed within the cell housing 185. Referring to FIG. 20B, at STAGE 1, the cathode ring 182 is formed within the cell housing 185 from the first portion of the cathode material. The cathode ring 182 can be molded into the housing via methods known in the art. The cathode ring 182 may also be compacted against the housing wall 184 to ensure good contact therewith. At STAGE 2, the preformed separator encapsulated anode 188 is inserted into the housing 185 within the interior space defined by the ring 182. At STAGE 3, the remaining space within the cell housing is filled with the remaining portion 190 of the cathode material. STEP 1 of FIG. 20C illustrates the formation of the pre-shaped separator encapsulated anode 188, such as by dies D, and its insertion within the interior space of the ring 182 within the cell housing 185. STEP 2 of FIG. 20C illustrates insertion of a cathode material injector 194 into the cell housing 185 between the folds of the anode 188. STEP 3 illustrates filling of the housing 185 with the cathode material as the injector 194 exits the housing 185. Thus, in this embodiment, the majority of the forming steps are carried out by using the housing to contain the assembly.

Figure 20D:
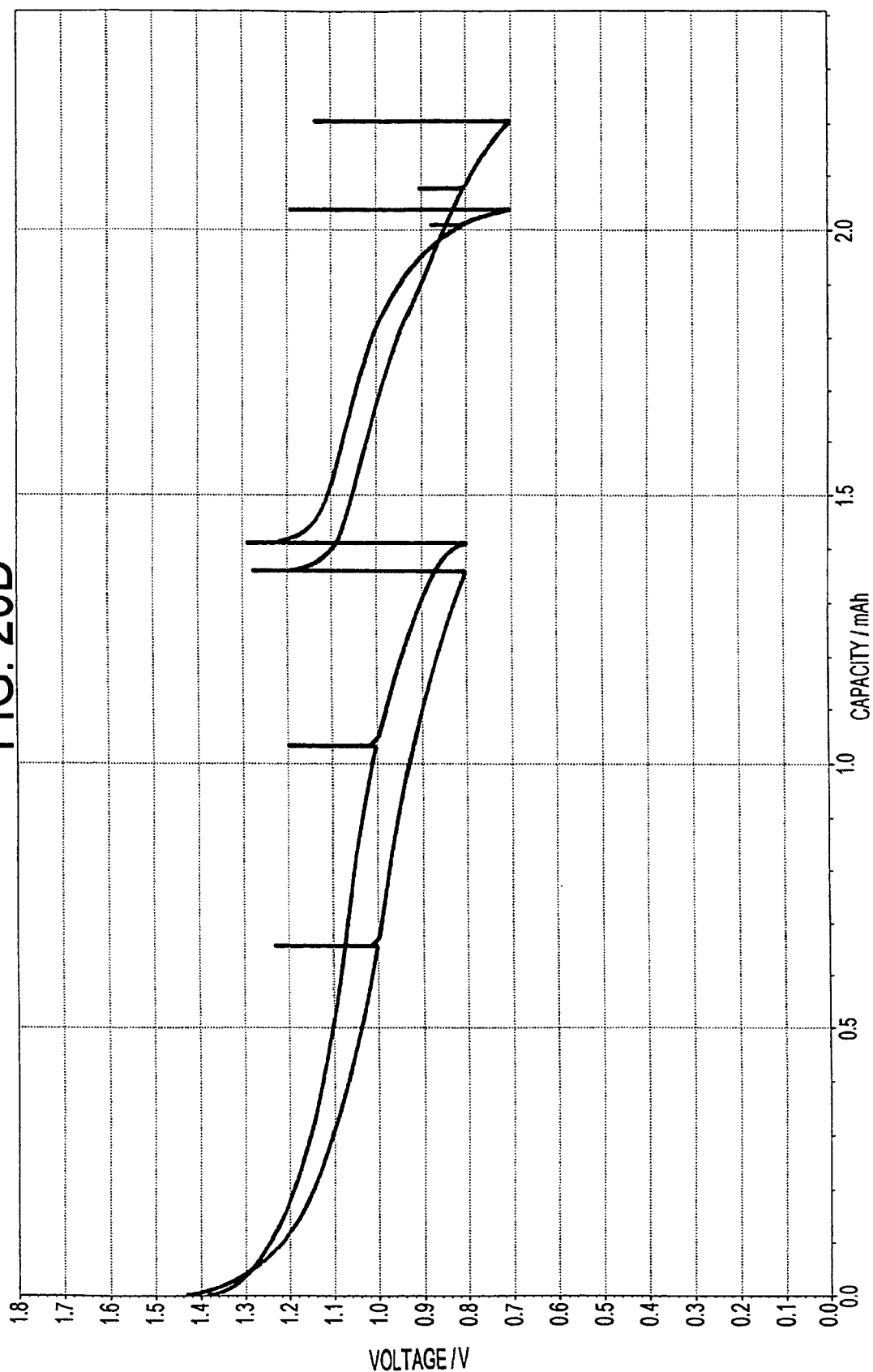
FIG. 20D is a graph depicting performance characteristics of cells manufactured according to the method of FIG. 20A-20C.

FIG. 20D illustrates discharge curves for two cells formed by the methods described with respect to FIGS. 20A-20C. The $MnO_2$ cathode premix formulation used to form the concentric rings consisted of a premix of Kerr-McGee High Drain EMD 89%, Superior Graphite ABG1010 graphite 6%, and 9 N KOH 5%, on a weight basis. Four rings were prepared from this material each with a height of 0.394" and an interior diameter of 0.4 inches. A separator pouch of 40 mm×40 mm was prepared out of Scimat SM700/79 separator containing a tin coated steel substrate and was filled with approximately 6.5 g of zinc gel formulation consisting of 65% zinc powder, 34.5% KOH and 0.5% carbopol to form the anode assembly. The anode was pre-folded into the shape of a W. A second cathode formulation consisting of a premix of Kerr-McGee High Drain EMD 56.5%, Superior Graphite ABG1010 graphite 5.2%, PTFE-30 Suspension 0.3%, and 9 N KOH 38%, on a weight basis was used to form the interior cathode portion. This latter cathode material was divided into 3 approximately equal portions of 2.3 g, each being pressed into the V-shaped grooves of the folded anode and the entire electrode assembly was placed into a 0.520 inch compression die for compression prior to inserting into a AA size can. Two cells similarly prepared when discharged at a constant current of 1 Amp to 1 Volt yielded a capacity of 0.7 to 1.05 Ah and on further discharge over a 3.9 ohm resistor to 0.7 Volts a cumulative capacity of 2.05 to 2.2 Ah.

Figure 20E:
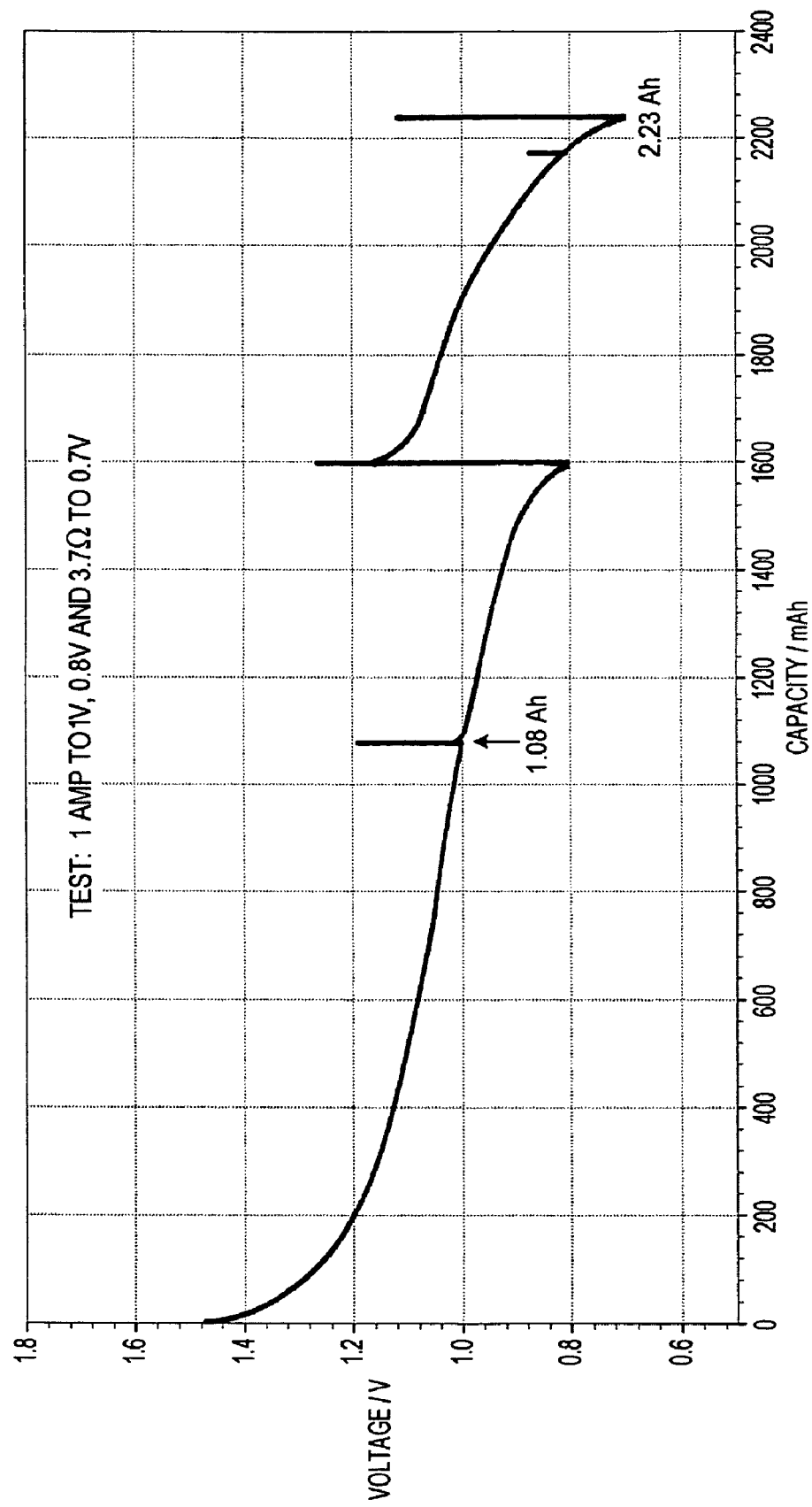
FIG. 20E is a graph depicting performance characteristics of a cell manufactured similarly to the method of FIG. 20A-20C.

FIG. 20E illustrates a discharge curve for a cell formed by methods similar to those described with respect to FIGS. 20A-20C. This cell was formed identically to that described with respect to FIGS. 20A-20C in the manner in which the cathode rings are formed and the anode pouch. However, a cathode formulation consisting of a premix of Kerr-McGee High Drain EMD 71.4%, Superior Graphite ABG1010 graphite 6.6%, PTFE-30 Suspension 0.4%, and 9 N KOH 21.6%, on a weight basis was used to form the interior cathode portion. This cathode material was pressed in a flat die at 37.000 psi to a thickness of approx. 3 mm and then cut into bars of 6 mm wide×41.4 mm long. The bars were placed into the V-shaped grooves of the folded anode and the entire electrode assembly was placed into a 0.40 inch compression die for compression prior to inserting into a AA size can. This cell, when discharged at a constant current of 1 Amp to 1 Volt, yielded a capacity of 1.08 Ah and on further discharge over a 3.9 ohm resistor to 0.7 Volts yielded a cumulative capacity of 2.23 Ah.

It should be emphasized that, for all embodiments described herein where granulated cathode material is utilized a pasted anode arrangement is preferably utilized (which is essentially dry) to counter-balance the addition of electrolyte and the use of an extra-wet cathode material. Any swelling of the inner anode arrangement caused by the electrolyte will essentially further tighten up tolerances associated with the electrode assemblies and ensure good contact between the inner anode electrode and the outer electrode material, which benefits the performance characteristics of the cell.

While specific embodiments have been illustrated and described herein, numerous modifications may come to mind without significantly departing from the spirit of the invention, and the scope of protection is only limited by the scope of the accompanying Claims.

The invention claimed is:

1. A method of manufacturing an electrochemical battery cell, the method comprising the steps of:
 providing a battery cell housing including an interior space, a first terminal and a second terminal;
 providing an inner electrode comprising a gelled material and a current collector, the gelled material and current collector encapsulated by a separator and having a substantially flat configuration;
 folding the inner electrode into a folded configuration;
 providing an outer electrode material;
 molding the outer electrode material with the inner electrode to create an electrode assembly such that an outer extent of the electrode assembly is generally conforming to a contour defined by the interior space of the cell housing;
 disposing the electrode assembly within the interior space of the housing such that the outer electrode of the electrode assembly is in electrical communication with the first terminal of the cell housing and the inner electrode of the electrode assembly is in electrical communication with the second terminal of the cell housing.

2. A method of manufacturing an electrochemical battery cell, the method comprising the steps of:
 providing a battery cell housing including an interior space, a first terminal and a second terminal;
 providing a first portion of an outer electrode material;
 forming the first portion of the outer electrode material into a substantially flat configuration;
 providing an inner electrode comprising a gelled material and a current collector, the gelled material and current collector encapsulated by a separator and having a substantially flat configuration;
 disposing the inner electrode on the first portion of the outer electrode material;
 disposing a second portion of an outer electrode material on the inner electrode;
 forming the second portion of the outer electrode material into a substantially flat configuration to create an electrode stack;
 forming the electrode stack such that an outer extent of the electrode assembly is generally conforming to a contour defined by the interior space of the cell housing, thereby creating an electrode assembly;
 disposing the electrode assembly within the interior space of the housing such that the outer electrode of the electrode assembly is in electrical communication with the first terminal of the cell housing and the inner electrode of the electrode assembly is in electrical communication with the second terminal of the cell housing.

3. A method of manufacturing an electrochemical battery cell, the method comprising the steps of:

providing a battery cell housing including an interior space, a first terminal and a second terminal;

providing a first outer electrode portion;

forming the first outer electrode portion such that it is peripherally disposed within the interior space of the housing to define an interior space of the first outer electrode portion;

providing an inner electrode comprising a gelled material and a current collector, the gelled material and current collector encapsulated by a separator and having a substantially flat configuration;

folding the inner electrode into a folded configuration;

inserting the folded inner electrode within the interior space of the first outer electrode portion; and disposing a second outer electrode portion within the interior space of the first outer electrode portion.

* * * * *